(12) United States Patent
Speyer et al.

(10) Patent No.: US 12,590,038 B2
(45) Date of Patent: Mar. 31, 2026

(54) METHOD FOR MANUFACTURING TRANSPARENT CERAMIC MATERIALS

(71) Applicant: Georgia Tech Research Corporation, Atlanta, GA (US)

(72) Inventors: Robert F. Speyer, Atlanta, GA (US); Joseph Eun, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 724 days.

(21) Appl. No.: 18/048,008

(22) Filed: Oct. 19, 2022

(65) Prior Publication Data

US 2023/0127014 A1 Apr. 27, 2023

Related U.S. Application Data

(60) Provisional application No. 63/257,231, filed on Oct. 19, 2021.

(51) Int. Cl.
*C04B 35/626* (2006.01)
*C04B 35/01* (2006.01)
(Continued)

(52) U.S. Cl.
CPC .......... *C04B 35/6268* (2013.01); *C04B 35/01* (2013.01); *C04B 35/115* (2013.01); *C04B 35/44* (2013.01); *C04B 35/443* (2013.01); *C04B 35/46* (2013.01); *C04B 35/495* (2013.01); *C04B 35/50* (2013.01); *C04B 35/505* (2013.01); *C04B 35/581* (2013.01); *C04B 35/597* (2013.01); *C04B 35/62655* (2013.01); *C04B 35/6455* (2013.01); *C04B 35/6261* (2013.01);
(Continued)

(58) Field of Classification Search
None
See application file for complete search history.

(56) References Cited

U.S. PATENT DOCUMENTS 3,525,597 A * 8/1970 Lynch ..................... C04B 35/46
23/300
4,543,346 A * 9/1985 Matsui ................ C04B 35/6262
501/153
(Continued)

FOREIGN PATENT DOCUMENTS

CN 104446497 A * 3/2015
CN 109574650 A * 4/2019 ............. C04B 35/44
(Continued)

OTHER PUBLICATIONS

An et al. "Effect of LiF addition on spark plasma sintering of transparent Nd-doped Lu2O3 bodies" Journal of Asian Ceramic Societies 2 (2014) 154-157 (Year: 2014).*
(Continued)

*Primary Examiner* — Melvin C. Mayes
(74) *Attorney, Agent, or Firm* — TROUTMAN PEPPER LOCKE LLP; Ryan A. Schneider; Brandon M. Reed

(57) ABSTRACT

An exemplary embodiment of the present disclosure provides a method for manufacturing a transparent ceramic material. The method comprises providing a compact comprising a metal oxide and, during sintering, exposing the compact to a vapor comprising one of or both fluorine ions and lithium ions to form a transparent ceramic material comprising at least 90% of a theoretical transparency.

18 Claims, 20 Drawing Sheets

(51) Int. Cl.

| | |
|---|---|
| *C04B 35/115* | (2006.01) |
| *C04B 35/44* | (2006.01) |
| *C04B 35/443* | (2006.01) |
| *C04B 35/46* | (2006.01) |
| *C04B 35/495* | (2006.01) |
| *C04B 35/50* | (2006.01) |
| *C04B 35/505* | (2006.01) |
| *C04B 35/581* | (2006.01) |
| *C04B 35/597* | (2006.01) |
| *C04B 35/645* | (2006.01) |

(52) U.S. Cl.

CPC ................ *C04B 2235/3224* (2013.01); *C04B 2235/3225* (2013.01); *C04B 2235/3227* (2013.01); *C04B 2235/3239* (2013.01); *C04B 2235/3286* (2013.01); *C04B 2235/3409* (2013.01); *C04B 2235/445* (2013.01); *C04B 2235/5445* (2013.01); *C04B 2235/5454* (2013.01); *C04B 2235/604* (2013.01); *C04B 2235/6567* (2013.01); *C04B 2235/658* (2013.01); *C04B 2235/6587* (2013.01); *C04B 2235/661* (2013.01); *C04B 2235/764* (2013.01); *C04B 2235/77* (2013.01); *C04B 2235/9653* (2013.01)

(56) References Cited

U.S. PATENT DOCUMENTS

| | | | | | |
|---|---|---|---|---|---|
| 4,940,477 | A * | 7/1990 | Bocko | ..................... | C23C 16/30 |
| | | | | | 501/59 |
| 5,244,849 | A * | 9/1993 | Roy | ..................... | C04B 35/443 |
| | | | | | 501/153 |
| 7,211,325 | B2 * | 5/2007 | Villalobos | .............. | B82Y 30/00 |
| | | | | | 428/404 |
| 7,449,238 | B1 * | 11/2008 | Villalobos | .............. | B82Y 30/00 |
| | | | | | 428/407 |
| 12,180,119 | B2 * | 12/2024 | Tanaka | ..................... | G02B 1/02 |
| 2004/0266605 | A1 * | 12/2004 | Villalobos | ........... | C04B 35/6303 |
| | | | | | 501/118 |
| 2009/0297851 | A1 * | 12/2009 | Frage | ................... | C04B 35/443 |
| | | | | | 428/402 |
| 2010/0056357 | A1 * | 3/2010 | Loutfy | ............... | C04B 35/6455 |
| | | | | | 977/773 |
| 2010/0171075 | A1 * | 7/2010 | Chen | ..................... | C04B 35/443 |
| | | | | | 264/681 |
| 2012/0119146 | A1 * | 5/2012 | Sanghera | .............. | C04B 35/505 |
| | | | | | 252/301.4 R |
| 2012/0236409 | A1 * | 9/2012 | Yahagi | ................... | C30B 15/08 |
| | | | | | 451/28 |
| 2013/0045359 | A1 * | 2/2013 | Wang | ................... | C04B 35/505 |
| | | | | | 428/141 |
| 2013/0106009 | A1 * | 5/2013 | Sepulveda | .............. | B28B 3/025 |
| | | | | | 264/28 |
| 2013/0243679 | A1 * | 9/2013 | Kim | ....................... | B82Y 30/00 |
| | | | | | 423/592.1 |
| 2014/0002900 | A1 * | 1/2014 | Makikawa | ........... | G02F 1/0036 |
| | | | | | 252/583 |
| 2019/0345067 | A1 * | 11/2019 | Ikari | ................... | C04B 35/6262 |
| 2025/0100936 | A1 * | 3/2025 | Zhang | ................ | C04B 35/6455 |

FOREIGN PATENT DOCUMENTS

| | | | | | |
|---|---|---|---|---|---|
| WO | WO-03004437 | A1 * | 1/2003 | .......... | C04B 35/505 |
| WO | WO-2009128269 | A1 * | 10/2009 | ........ | C04B 35/6455 |
| WO | WO-2010150250 | A1 * | 12/2010 | ............ | C04B 35/44 |
| WO | WO2020108142 | A1 * | 6/2020 | | |

OTHER PUBLICATIONS

Eun et al. "Vapor-phase assisted sintering of lutetium oxide" Journal of the European Ceramic Society 42 (2022) 7570-7578 (Year: 2022).*

Hostasa et al. "Sintering aids, their role and behaviour in the production of transparent ceramics" Open Ceramics 7 (2021) 100137 (Year: 2021).*

Meir et al. "Synthesis and Densification of Transparent Magnesium Aluminate Spinel by SPS Processing" J. Am. Ceram. Society 92 [2] 368-364 (2009) (Year: 2009).*

Katherine Bolek "The Effect of Excess Lithium on the Phase Formation, Structure and Electrical Properties of LLZO Garnet Structured Solid State Electrolyte" Clemson University Thesis Aug. 2020 (Year: 2020).*

CN 109574650 Translation (Year: 2019).*

WO 2009128269 Translation (Year: 2009).*

* cited by examiner

108

108

106

106

108

106

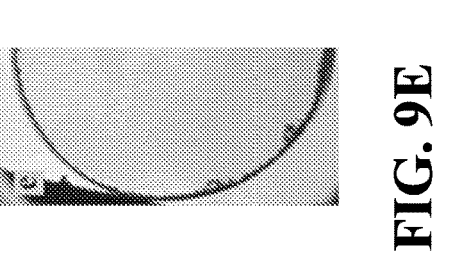
FIG. 9E
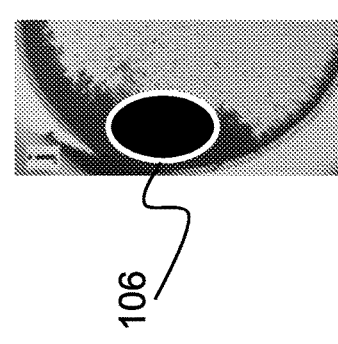
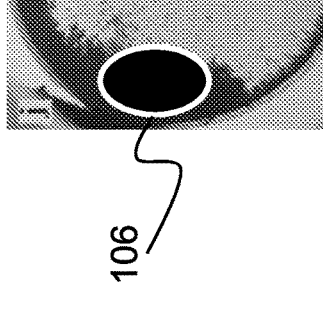
106
FIG. 9J
FIG. 9D
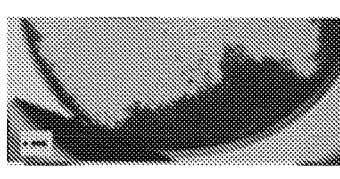
FIG. 9I
FIG. 9C
FIG. 9H
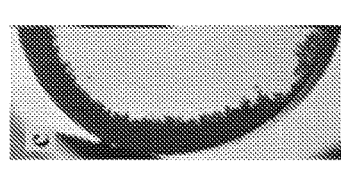
FIG. 9B
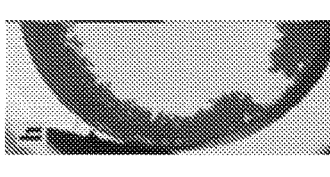
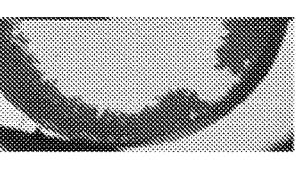
FIG. 9G
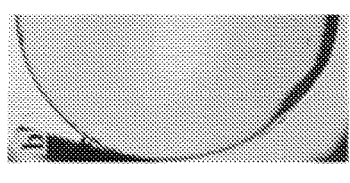
FIG. 9A
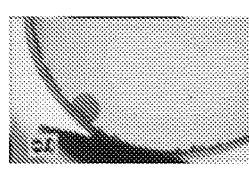
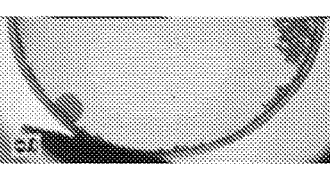
FIG. 9F
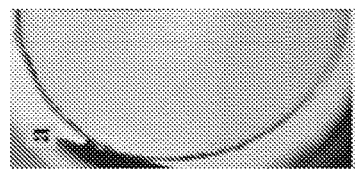
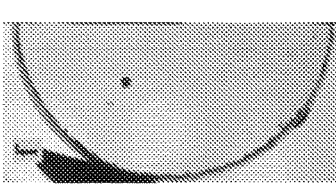

106

1900

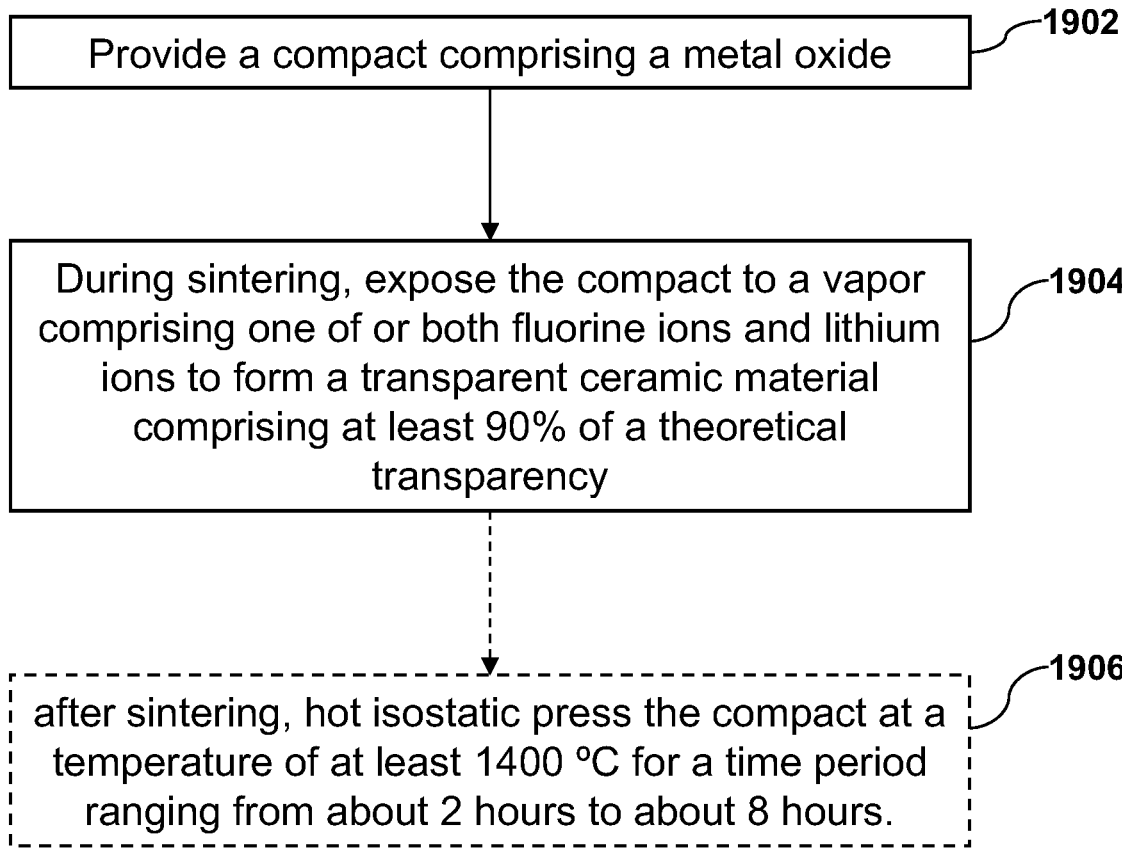

Provide a compact comprising a metal oxide — 1902

During sintering, expose the compact to a vapor comprising one of or both fluorine ions and lithium ions to form a transparent ceramic material comprising at least 90% of a theoretical transparency — 1904 after sintering, hot isostatic press the compact at a temperature of at least 1400 °C for a time period ranging from about 2 hours to about 8 hours. — 1906

FIG. 19

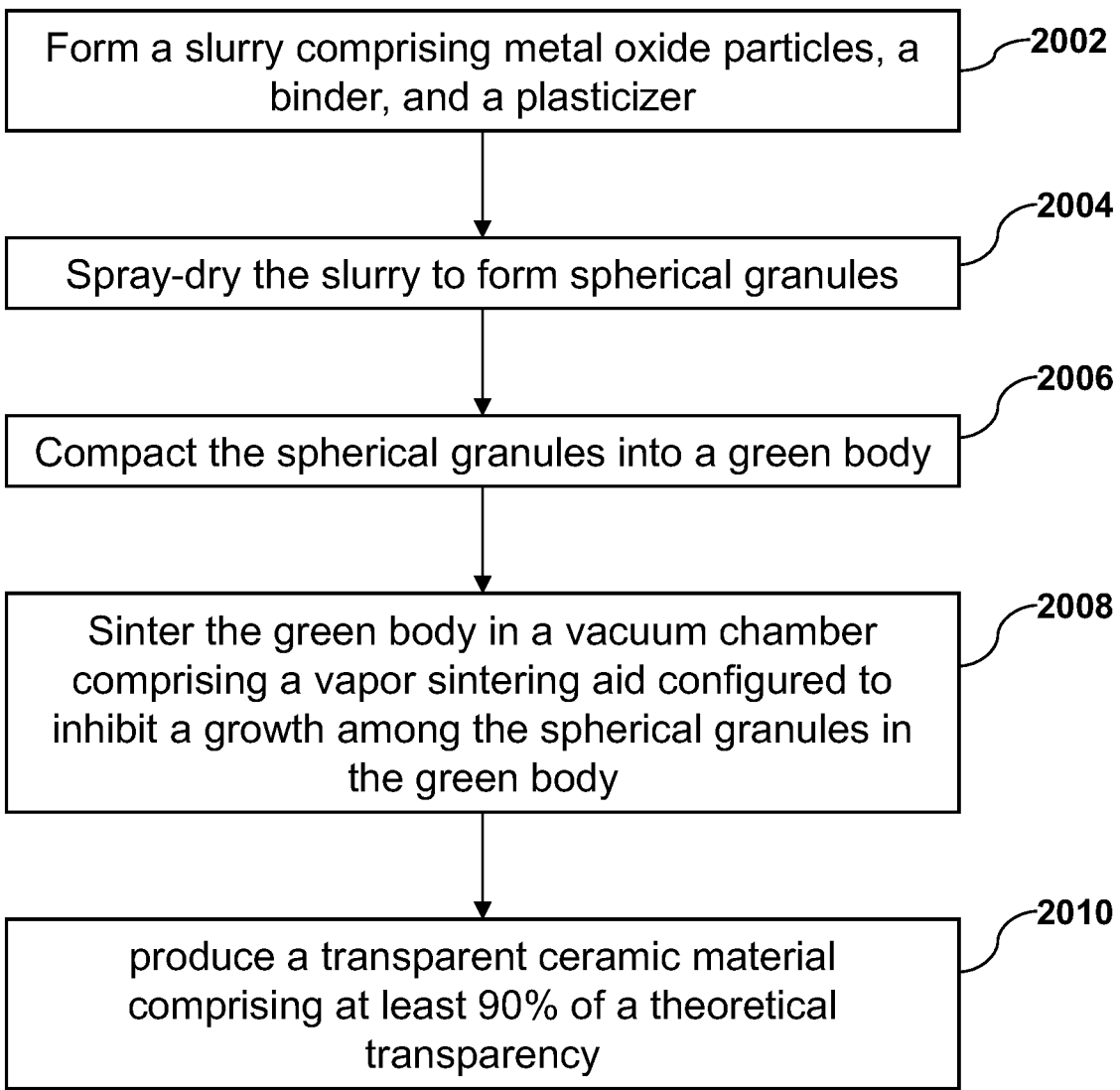

2000

Form a slurry comprising metal oxide particles, a binder, and a plasticizer —2002

Spray-dry the slurry to form spherical granules —2004

Compact the spherical granules into a green body —2006

Sinter the green body in a vacuum chamber comprising a vapor sintering aid configured to inhibit a growth among the spherical granules in the green body —2008 produce a transparent ceramic material comprising at least 90% of a theoretical transparency —2010

FIG. 20

METHOD FOR MANUFACTURING TRANSPARENT CERAMIC MATERIALS

CROSS-REFERENCE TO RELATED APPLICATIONS

This application claims the benefit of U.S. Provisional Application Ser. No. 63/257,231, filed on 19 Oct. 2021, which is incorporated herein by reference in its entirety as if fully set forth below.

FEDERALLY SPONSORED RESEARCH STATEMENT

This invention was made with government support under grant/award number FA9550-18-1-0083 awarded by the Air Force Office of Scientific Research (AFOSR). The government has certain rights in the invention.

FIELD OF THE DISCLOSURE

The various embodiments of the present disclosure relate generally to systems and methods for producing transparent ceramic materials, and more particularly to systems and methods for producing rare earth element-containing transparent ceramics.

BACKGROUND

In the processing of high-performance ceramic materials, the standard practice is to form a green body, comprised of a mixture of ceramic powder and various organic and inorganic additives, and then sintering the green body to transform the material into the ceramic. Applications for transparent ceramics vary from laser hosts to abrasion resistant surfaces (e.g. watch glass, supermarket scanners, etc.) which are presently served by very expensive single crystal sapphire. Sintering ceramics to window-like transparency is very difficult due to abnormal grain growth which concurrently occurs during the later stages of sintering. Abnormal grain growth can sweep porosity inside grains where the pores cannot be removed by continued sintering or post-hot isostatic pressing (HIPing). Pores are highly efficient at scattering light, causing the ceramic to be translucent to opaque.

Thus, there is a need for processing methods that inhibit grain growth and permit sintering/post HIPing to generate zero porosity and transparency within the ceramic material. This can be achieved by controlling the parameters in forming the green compact, and inhibiting abnormal grain growth during sintering.

BRIEF SUMMARY

The present disclosure relates to systems and methods for producing transparent ceramic materials. An exemplary embodiment of the present disclosure provides a method for manufacturing a transparent ceramic material. The method can include providing a compact comprising a metal oxide and, during sintering, exposing the compact to a vapor comprising one of or both fluorine ions and lithium ions to form a transparent ceramic material comprising at least 90% of a theoretical transparency.

In any of the embodiments disclosed herein, the method can include providing a material comprising lithium and fluorine and thermally vaporizing, proximate the compact, the material comprising lithium and fluorine to produce the vapor.

Additionally, in accordance with an embodiment of the present disclosure can include thermally vaporizing the material comprising lithium and fluorine comprises a temperature of at least 800° C.

Further in accordance with some embodiments of the present disclosure, a vacuum pressure is applied during sintering, and the material comprising lithium and fluorine, upstream from the compact, is positioned with respect to a direction of gaseous flow toward a vacuum source.

Still further in accordance with some embodiments of the present disclosure can include forming the compact comprising steps of drying a slurry comprising the metal oxide to form a granulated powder, pressing the granulated powder, and heat-treating the granulated powder to form the compact.

Moreover, in accordance with some embodiments of the present disclosure can include after sintering, hot isostatic pressing the compact at a temperature of at least 1400° C.

Additionally, in accordance with some embodiments of the present disclosure can include after sintering, hot isostatic pressing the compact for a time period ranging from about 2 hours to about 8 hours.

Further in accordance with some embodiments of the present disclosure the metal oxide can include a material selected from the group consisting of $B_2O_3$, $Al_2O_3$, AlON, SiAlON, $In_{0.74}Sn_{0.18}O_{0.08}$ (ITO), $Ga_2O_3$, $In_2O_3$, $Sc_2O_3$, $Y_2O_3$, $Lu_2O_3$, $La_2O_3$, $Ac_2O_3$, $TiO_2$, $V_2O_3$, $Nd_2O_3$, $Eu_2O_3$, $Gd_2O_3$, $Tb_2O_3$, $Dy_2O_3$, $Ho_2O_3$, $Tm_2O_3$, $Yb_2O_3$, $LuYO_3$, $Y_3Al_5O_{12}$, $MgAl_2O_4$, and combinations thereof.

Still further in accordance with an embodiment of the present disclosure prior to sintering, the method can include doping the compact by a range of approximately 2 mol % to 20 mol % of a dopant.

In some embodiments, a transparent ceramic material manufacturing method can include forming a slurry of metal oxide particles, a binder, and a plasticizer, spray-drying the slurry to form spherical granules, compacting the spherical granules into a green body, sintering the green body in a vacuum chamber comprising a vapor sintering aid configured to inhibit a growth among the spherical granules in the green body, and producing a transparent ceramic material comprising at least 90% of a theoretical transparency.

Additionally, in some embodiments, the method can include forming a transparent ceramic material comprising a relative density of at least 90%.

Further in accordance with some embodiments of the present disclosure can include a vapor sintering aid comprising one or both of fluorine ions and lithium ions.

Still further in accordance with some embodiments of the present disclosure can include positioning the vapor sintering aid upstream in the vacuum pump chamber from the green body with respect to a direction of flow to a vacuum source.

Moreover, in accordance with some embodiments of the present disclosure can include forming the slurry by ball milling the metal oxide particles to a diameter ranging from about 50 nm to about 500 nm.

Additionally, in accordance with some embodiments of the present disclosure, the method can include compacting the slurry comprises spray-drying the slurry into spherical granules.

Further in accordance with any of the embodiments of the present disclosure, the method can include compacting the slurry further by pressing the spherical granules comprising wherein granule compaction comprises steps of pressing a first pressure of at least 100 megapascals (MPa), pressing a second pressure of at least 300 MPa, and heating to a temperature of at least 500° C.

Still further in accordance with some embodiments of the present disclosure, the method can include, after sintering, hot isostatic pressing of the green body at a temperature of at least 1400° C.

Moreover, in accordance with some embodiments of the present disclosure, the method can include, after sintering, hot isostatic pressing of the green body for a time period ranging from about 2 hours to about 8 hours.

Additionally, in accordance with any of the embodiments of the present disclosure, the metal oxide can include a material selected from the group consisting of $B_2O_3$, $Al_2O_3$, AlON, SiAlON, $In_{0.74}Sn_{0.18}O_{0.08}$ (ITO), $Ga_2O_3$, $In_2O_3$, $Sc_2O_3$, $Y_2O_3$, $Lu_2O_3$, $La_2O_3$, $Ac_2O_3$, $TiO_2$, $V_2O_3$, $Nd_2O_3$, $Eu_2O_3$, $Gd_2O_3$, $Tb_2O_3$, $Dy_2O_3$, $Ho_2O_3$, $Tm_2O_3$, $Yb_2O_3$, $LuYO_3$, $Y_3Al_5O_{12}$, $MgAl_2O_4$, and combinations thereof.

Further in accordance with some embodiments of the present disclosure, the method can include, prior to sintering, doping the green body by a range of approximately 2 mol % to 20 mol % of a dopant.

These and other aspects of the present disclosure are described in the Detailed Description below and the accompanying drawings. Other aspects and features of embodiments will become apparent to those of ordinary skill in the art upon reviewing the following description of specific, exemplary embodiments in concert with the drawings. While features of the present disclosure may be discussed relative to certain embodiments and figures, all embodiments of the present disclosure can include one or more of the features discussed herein. Further, while one or more embodiments may be discussed as having certain advantageous features, one or more of such features may also be used with the various embodiments discussed herein. In similar fashion, while exemplary embodiments may be discussed below as device, system, or method embodiments, it is to be understood that such exemplary embodiments can be implemented in various devices, systems, and methods of the present disclosure.

BRIEF DESCRIPTION OF THE DRAWINGS

The following detailed description of specific embodiments of the disclosure will be better understood when read in conjunction with the appended drawings. For the purpose of illustrating the disclosure, specific embodiments are shown in the drawings. It should be understood, however, that the disclosure is not limited to the precise arrangements and instrumentalities of the embodiments shown in the drawings.

FIGS. 9A-9J provide back-lit images of example transparent ceramics made by varying parameters, in accordance with an exemplary embodiment of the present invention.

FIG. 19 provides a flowchart of an example method for manufacturing transparent ceramics, in accordance with an exemplary embodiment of the present invention.

FIG. 20 provides a flowchart of an example method for manufacturing transparent ceramics, in accordance with an exemplary embodiment of the present invention.

DETAILED DESCRIPTION

To facilitate an understanding of the principles and features of the present disclosure, various illustrative embodiments are explained below. The components, steps, and materials described hereinafter as making up various elements of the embodiments disclosed herein are intended to be illustrative and not restrictive. Many suitable components, steps, and materials that would perform the same or similar functions as the components, steps, and materials described herein are intended to be embraced within the scope of the disclosure. Such other components, steps, and materials not described herein can include, but are not limited to, similar components or steps that are advanced after development of the embodiments disclosed herein.

Solid state sintering of high-performance ceramics to near theoretical density is always challenged by concurrent grain growth in the later stages of sintering, as the microstructure lowers its free energy by eliminating relatively high-energy grain boundary area. When this occurs rapidly, and to a significant extent (abnormal grain growth), porosity at grain boundaries/triple points is swept into grain interiors. At these locations, neither further sintering, nor subsequent post hot isostatic pressing will remove the remaining porosity.

In order to control the optical properties of a polycrystalline material, systems and methods for controlling the microstructure and eliminating the birefringence-based scattering effect of non-cubic materials during the fabrication process is needed. As mentioned in more detail below, light-scattering interfaces in the microstructure can be avoided by eliminating all the pores and controlling the grain size for birefringent grains. This can be achieved by controlling the parameters during green processing and the sintering process, through optimization of temperature and time, and with the use of a sintering aid or grain-growth inhibitor.

Figure 1A:
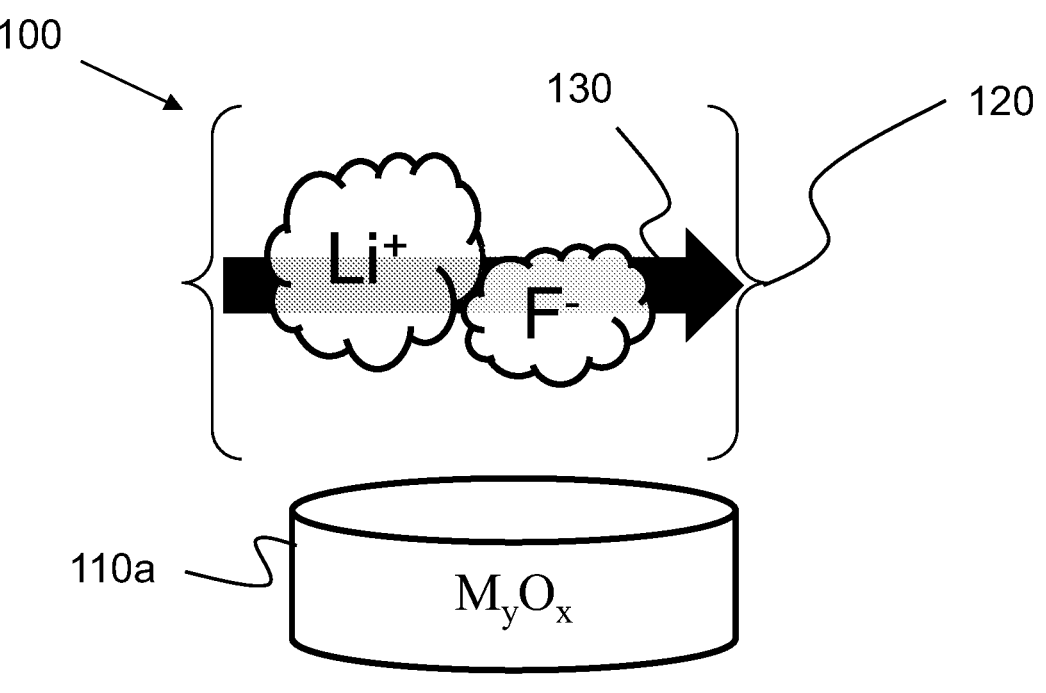
FIG. 1A provides a schematic of a method of exposing a metal oxide compact to a vapor sintering aid, in accordance with an exemplary embodiment of the present invention.

As shown in FIG. 1A, an exemplary embodiment of the present invention provides a schematic of a system 100 and method of exposing a metal oxide compact 110a to a vapor sintering aid 120, functioning through action as a grain growth inhibitor, illustrating non-limiting example of LiF vapor. In some examples, and as illustrated, exposure of a sintering compact to the vapor sintering aid 120 can be done under a vacuum-pump induced flow 130.

Figure 1B:
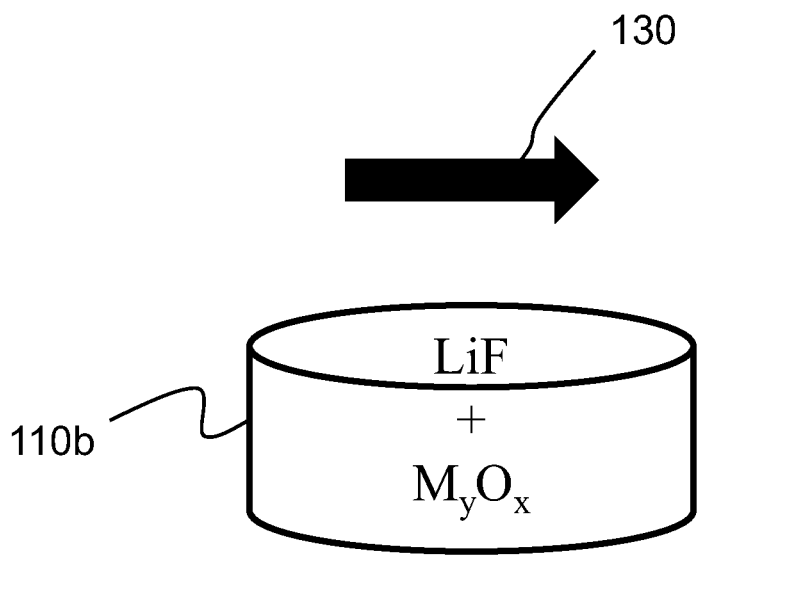
FIG. 1B provides a schematic of prior art methods of mixing an additive within the metal oxide compact.

While additives for various ceramic systems have been developed that inhibit grain growth, the method of mixing such additives within the green body has failed to produce near theoretical density or full transparency via pressureless sintering. According to the prior art, additives such as carbon, SiC, $Al_2O_3$, $TiB_2$, $AlF_3$, and $W_2B_5$ have been used as sintering agents in pressureless sintering to increase the sintered density. Compared to prior use of LiF, as shown in FIG. 1B, where LiF is mixed as an additive within the metal oxide compact 110b, the systems and methods disclosed herein do not mix the vapor sintering aid within the metal oxide compact to be formed into the transparent ceramic.

Prior to forming the metal oxide compact 110a, the metal oxides can be obtained by calcination of the metal oxide (600-1200° C.), followed by ball milling to obtain sinter-grade powder. In some embodiments, the metal oxides can be commercially-available high purity agglomerated metal oxide powders. In some examples, the metal oxides are provided in a powder that can be further processed with ball milling to produce the desired particle size. The particles can be submicron particles and can range from 100 nm to about 10 µm. As would be appreciated by one of skill in the relevant art, an ideal size of particles, leading to the size of grains in a sintered microstructure, is smaller than the desired wavelength of light, which eliminates grain boundary light scattering. In addition, compact 110a can be made up of single-crystal particles that during the sintering process, transform into a single polycrystalline solid. For instance, single-crystal $Lu_2O_3$ can be sintered together under appropriate conditions to generate a polycrystalline transparent ceramic.

In some embodiments, a compact comprising lutetium oxide with vapors of lithium fluoride ions produced in the proximity of a sintering compact acts as a remarkable grain growth inhibitor and thus sintering aid, significantly facilitating the fabrication of highly transparent lutetia. Surprisingly, using a sintering aid/grain growth inhibitor as done in prior methods (mixed within the metal oxide compact) led to unexpected results in an adjacent metal oxide compact lacking the sintering aid. In one example, two $Lu_2O_3$ pressed and cold isostatically pressed (CIPed) compacts were placed in a sintering furnace. One compact had 1 wt. % LiF powder distributed within the $Lu_2O_3$ compact. It was expected that this specimen would demonstrate improved sintering because of the additive. Instead, its sintering was rather poor (67% relative density), while the neighboring specimen (which had no additive) sintered to 95% relative density, which was much higher than sintered relative densities obtain previously. The additive-free specimen was placed in the furnace between the specimen which contained the additive, and the vacuum pump extracting gas inside the chamber. LiF vapors exited one specimen, and when passing the specimen without LiF additive, the LiF vapors were absorbed onto particle surfaces and during sintering, were retained at grain boundaries. They lowered grain boundary energy, in turn attenuated grain growth.

Vaporous sintering aid can include one or both of lithium and fluorine, as established in LiF vapors. For example, suitable fluorinated gas sintering aids can include fluorine ($F_2$), perfluorocarbons, sulphur hexafluoride ($SF_6$), or nitrogen trifluoride ($NF_3$). In addition, vapor sintering aid may also include fluoride salts that melt and vaporize during the sintering process. For example, suitable fluoride salts can include lithium fluoride (LiF) having a melting point of 845° C., sodium fluoride having a melting point of 993° C., lithium tetrafluoroborate ($LiBF_4$) having a melting point of 296.5° C., lithium hexafluorophosphate ($LiPF_6$) having a melting point of 200° C., beryllium fluoride ($BeF_2$) having a melting point of 554° C., magnesium fluoride ($MgF_2$) having a melting point of 1,263° C., barium fluoride ($BaF_2$) having a melting point of 1,368° C., calcium fluoride ($CaF_2$) having a melting point of 1,418° C., sodium fluoride (NaF) having a melting point of 993° C., or potassium fluoride (KF) having a melting point of 858° C. In certain embodiments, vapor sintering aid may also include lithium salts that melt and vaporize during the sintering process. Example lithium salts can include lithium chloride (LiCl) having a melting point of 605° C., lithium bromide (LiBr) having a melting point of 552° C., or lithium iodide (LiI) having a melting point of 469° C.

The vapor sintering aid may function by physisorbing onto particle surfaces within the compact. As these free surfaces convert to grain boundaries in the process of sintering, these absorbed species are resident along the grain boundaries. There, they serve to lower grain boundary energy and remove thermodynamic motivation for grain growth. This occurs because of the differing size and charge of these species as compared to host ions. They can form bonding bridges across the highly defective grain boundaries, reducing the number of unsatisfied bonds at the grain boundaries. As used herein, physisorption is the adsorption in which the atomic interactions between the adsorbate atoms and the adsorbent are primarily governed by van der Waals forces. In certain examples, either one or both of the lithium ion or the fluorine ion may physisorb to particle surfaces within the $Lu_2O_3$ compacts during sintering.

Referring back to FIG. 1A, system 100 may include providing a compact 110a (sometimes referred to as a green body) that includes a metal oxide. In some embodiments, the metal oxide can include a compound selected from the group consisting of $B_2O_3$, $Al_2O_3$, $Ga_2O_3$, $In_2O_3$, $Tl_2O_3$, $As_2O_3$, $Sb_2O_3$, $Bi_2O_3$, $Rb_4O_6$, $Cs_4O_6$, $Sc_2O_3$, $Y_2O_3$, $Lu_2O_3$, $La_2O_3$, $Ac_2O_3$, $Ti_2O_3$, $Ce_2O_3$, $V_2O_3$, $Pr_2O_3$, $Cr_2O_3$, $Mo_2O_3$, $W_2O_3$, $Nd_2O_3$, $Mn_2O_3$, $Pm_2O_3$, $Np_2O_3$, $Fe_2O_3$, $Sm_2O_3$, $Pu_2O_3$, $Co_2O_3$, $Rh_2O_3$, $Ir_2O_3$, $Eu_2O_3$, $Am_2O_3$, $Ni_2O_3$, $Gd_2O_3$, $Cm_2O_3$, $Cu_2O_3$, $Au_2O_3$, $Tb_2O_3$, $Bk_2O_3$, $Dy_2O_3$, $Cf_2O_3$, $Ho_2O_3$, $Es_2O_3$, $Tm_2O_3$, $Yb_2O_3$, $LuYO_3$, $Y_3Al_5O_{12}$, $MgAl_2O_4$, and combinations or mixtures thereof. As would be appreciated by one of skill in the art, the metal oxide composition can be tailored for the application of a transparent ceramic. For instance, solid state laser hosts may include $Nd^{3+}$-doped neodymium YAG (yttrium aluminum garnet, $Y_3Al_5O_{12}$), or Ruby ($Al_2O_3$). Transparent ceramics may also include more scratch resistant materials compared to glass, such as $Al_2O_3$ having a grain size below the wavelength of light. For infrared transmitting ceramics used in night vision goggles, missile domes, or windows for infrared temperature scanners, the transparent ceramics may include $Al_2O_3$, $Y_2O_3$, or $V_2O_5$. For transparent armor, the ceramics material may include $Al_2O_3$, AlON, SiAlON, or Spinel ($MgAl_2O_4$). In addition, transparent ceramics may simultaneously be electrically conductive materials such as $In_{0.74}Sn_{0.18}O_{0.08}$ (ITO), aluminum-, gallium-, or indium-doped zinc oxide (AZO, GZO, or IZO). In some embodiments, rare-earth sesquioxides may be ideal for mechanical enhancements and transparency improvements.

Although not illustrated in FIG. 1A, compact 102 may also include a binder and a plasticizer mixed with the metal oxide particles. The compact in the green state may be formed from a slurry, which is an aqueous suspension/dispersion of the metal oxide particles and any additives required for processing, including binders and plasticizers. The binder and plasticizer may each independently be ingredients soluble in water, acetone, alcohol, or organic solvents. In certain embodiments, the binder may be formed from a homopolymerization or a copolymerization with a plasticizer. Example binder/plasticizer systems may include polymer systems such as polymethyl methacrylate (PMMA) with dibutyl phthalate (DBT), isobutyl/n-butyl methacrylate, polyethylene terephthalate (PET), polymethylsiloxane, polydimethylsiloxane (PDMS), and the like. Other binder/plasticizer systems may include polyvinyl alcohol with polyethylene glycol.

Figure 2:
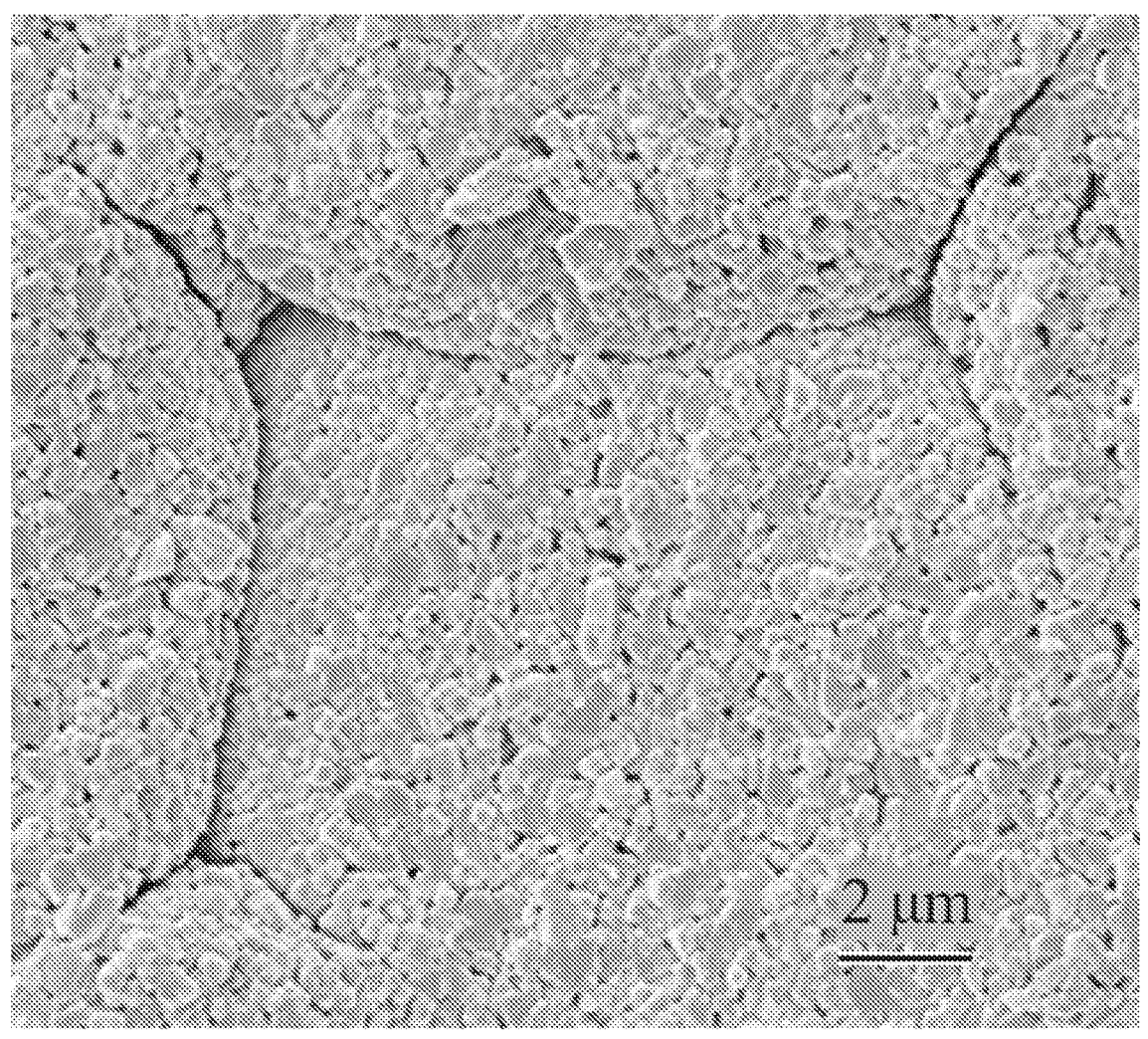
FIG. 2 provides an image of an example compact, in accordance with an exemplary embodiment of the present invention.

Referring to FIG. 2, a microstructure of a compact of $Lu_2O_3$ with PMMA binder with no plasticizer can be formed from ball-milled and spray-dried powder. This specimen, after thermolysis heat-treatment, can be exposed to a vacuum sintering treatment of heating at 25° C./min to 1600° C. with or without vapor sintering aid. Without adjustments to the binder system and sintering temperature/time schedule, the outlines of spray-dried granules, pressed into mutual accommodation, can be clearly seen.

Figures 3A, 3B, 3C, 3D, 3E, 3F:
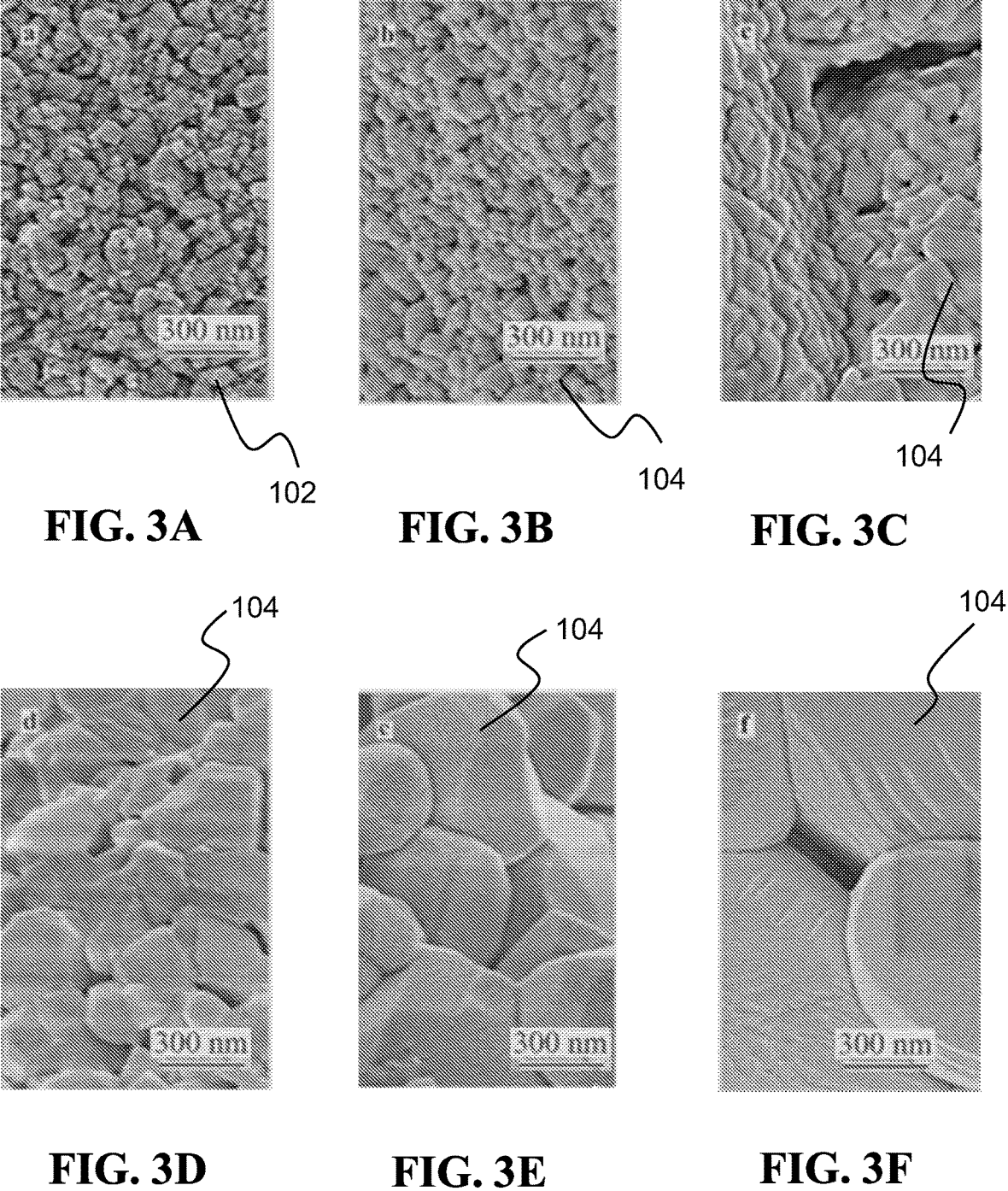
FIGS. 3A-3F provide images of example heat-treated compacts, in accordance with an exemplary embodiment of the present invention.

Binders can be used in the processing of transparent ceramic materials to add handling strength in the green body. The slurry may be slip cast in a porous mold (e.g. gypsum) for the formation of a near-net shape body, such as domes, lenses, and the like. After spray-drying, spherical granules 104 are formed and can be pressed onto a near-net shape and sintered into transparent ceramics. The process of grain growth during sintering without the use of a grain growth inhibitor is shown in detail in FIGS. 3A-3F. FIG. 3A shows particles in the compact after pressing, but before thermolysis heat treatment and sintering. In particular, FIG. 3A illustrates a compacted microstructure formed from ball-milled and spray-dried powder to form a green body. Specifically, microstructures of an unfired powder compact specimen can be seen. FIG. 3B provides a specimen exposed to a thermolysis heat-treatment at 1° C./min to 900° C., 6 h dwell, in flowing oxygen to remove certain organics.

FIG. 3C provides a specimen exposed to a thermolysis heat-treatment at 1° C./min to 900° C., 6 h dwell, in flowing oxygen and then after a heating rate of 25° C./min, a 15 minute 1200° C. dwell under constant-pumping vacuum conditions. FIG. 3D provides a specimen exposed to a thermolysis heat-treatment at 1° C./min to 900° C., 6 h dwell, in flowing oxygen and then heated at 25° C./min to 1400° C., with a 15 minute dwell under constant pumping vacuum. FIG. 3E provides a specimen exposed to a thermolysis heat-treatment at 1° C./min to 900° C., 6 h dwell, in flowing oxygen and then under 15 minute 1600° C. vacuum dwell using a heating rate of 25° C./min. FIG. 3F provides a specimen exposed to a thermolysis heat-treatment at 1° C./min to 900° C., 6 h dwell, in flowing oxygen and then under 15 minute 1700° C. vacuum dwell using a heating rate of 25° C./min.

Grain growth concurrent to sintering can be seen in FIG. 3C, where the inter-granular boundaries are merging. In FIGS. 3D-3F, the sintering process at temperatures ranging from about 1200° C. to about 1700° C. illustrate further growth along grain boundaries. After vacuum sintering, the specimen can be immediately cooled to produce the transparent ceramics.

Turning to FIGS. 3A-3F, the compacts may undergo thermolysis heat-treatment to remove organic components (e.g. binders or plasticizers) mixed with the green body. These components can be added to assist in the compaction by facilitating mutual particle sliding under load, and to give the compact green handling strength. Microstructures can further develop during heat-treatment of $Lu_2O_3$ powder compacts, however, use of the disclosed vapor sintering aid, which also functions as a grain growth inhibitor, can generate greater transparency (described in more detail with reference to FIGS. 4A and 4B).

Figure 4A:
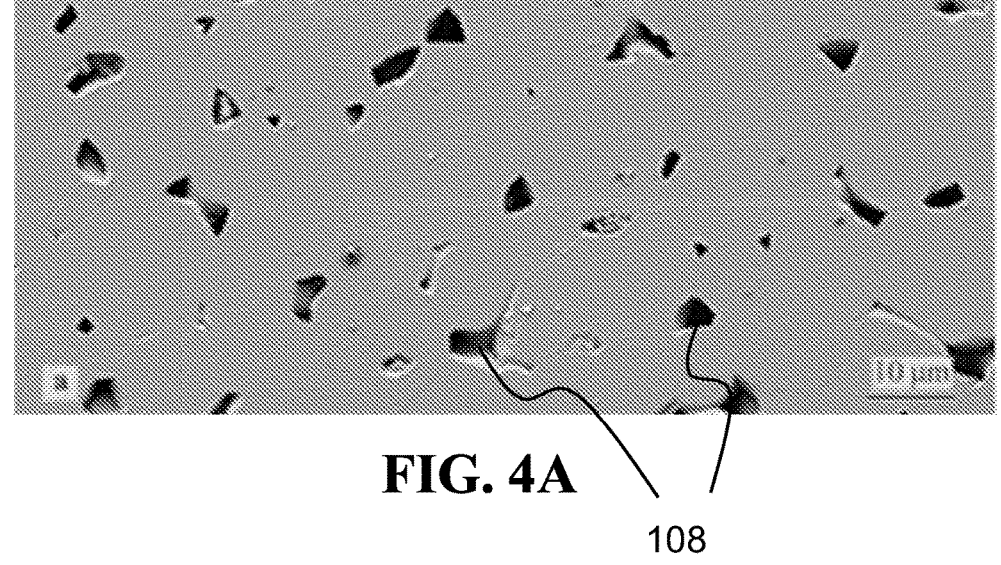
FIGS. 4A and 4B provide images of example compacts, in accordance with an exemplary embodiment of the present invention.
Figure 4B:
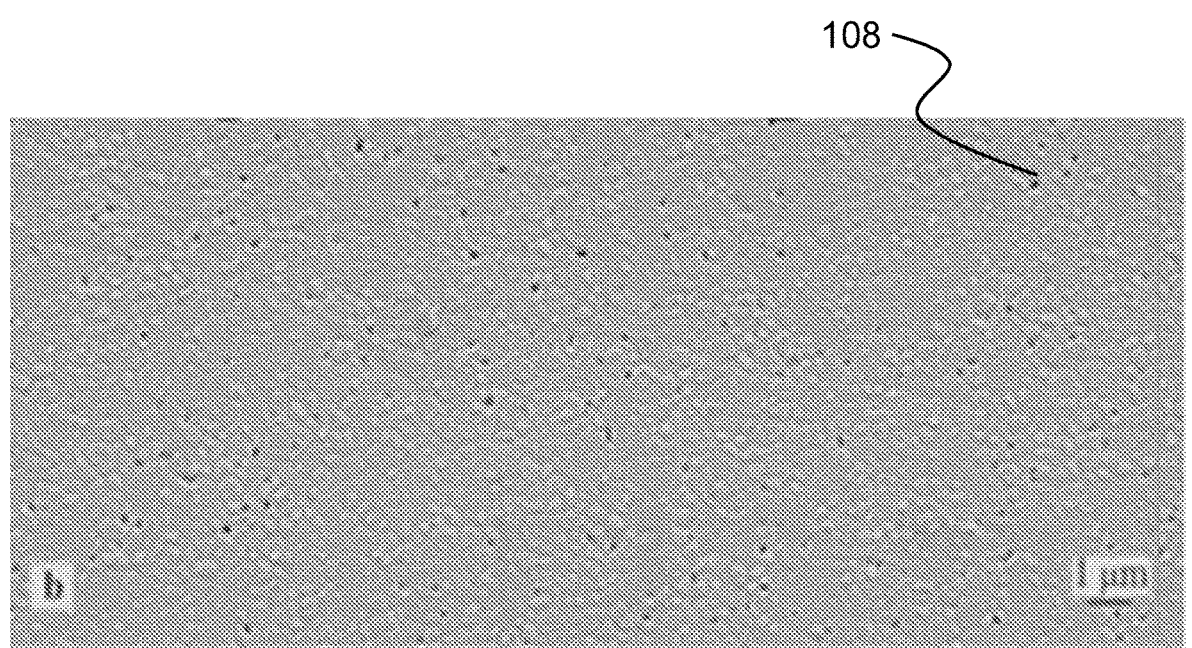

FIGS. 4A and 4B provide images of microstructures of sintered specimens of identical powder compacts with and without vapor sintering aid. FIG. 4A shows the result of no hot-zone LiF (acting as vapor sintering aid), sintered 1600° C. with a 4 h dwell, producing approximately 94% relative density. On the other hand, FIG. 4B shows with a LiF hot-zone additive (vapor sintering aid), sintered at 1600° C., 5 min dwell, immediately cooled to 1400° C., 12 h dwell, producing approximately 97% relative density. Heating rates for both micrographs were 25° C./min. As shown, the specimen of FIG. 4B exposed to vapor sintering aid resulted in significantly smaller grain and pore sizes 106 and lower overall porosity, thereby generating higher relative densities. In addition, the specimen of FIG. 4B was generated under lower sintering temperatures (around 1400° C. versus 1600° C. for the specimen in FIG. 4A).

Figure 5A:
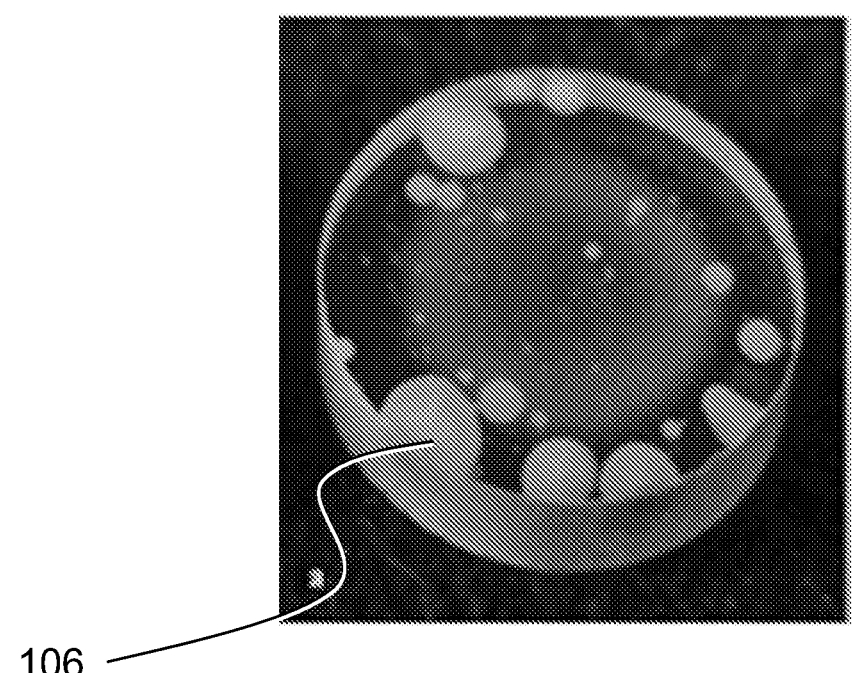
FIGS. 5A and 5B provide a photograph (FIG. 5A) and an SEM image (FIG. 5B) of an example transparent ceramic, in accordance with an exemplary embodiment of the present invention.

Polished compacts can be produced in any suitable shape for the application. For instance, as shown in FIGS. 5A and 10B, the polished specimen 110 can be molded into cylindrical shapes. Other suitable dimensions may include symmetrical shapes such as squares, rectangles, spheres, lenses and the like. Asymmetric shapes may also be produced when the compact is molded into such form.

The compaction step can include one or more of series of pressing under pressure applied uniaxially, pressing under pressure applied by dual action pressing, and/or pressing under pressure applied isostatically. Isostatic pressing of the green body can be done under various temperature parameters. As used herein, cold isostatic pressing (CIPing) is the application of pressure to materials for a specified amount of time in order to improve their uniformity in particle packing efficiency using a sealed and evacuated enclosure (e.g., latex bag) as a pressure-transferring medium. This is then inserted into the CIP unit for pressure-processing where the bag is the pressure-transferring medium from a pressurized liquid (e.g. water). Similarly, hot isostatic pressing (HIPing) is the simultaneous application of high temperature and pressure (via pressurized argon gas) to materials for a specified amount of time in order to improve their mechanical properties. In either process, the material can be enclosed in a pressure vessel. The temperature, pressure, and process time can be precisely controlled to achieve the optimum material properties. Parts can be heated in an inert gas or under vacuum, which the heated gas applies "isostatic" pressure uniformly in all directions. This can cause the material to become "plastic" allowing voids to collapse under the differential pressure.

In certain embodiments, the spray-dried granules can also include a plasticizer/binder system having a glass transition temperature within the range of temperature parameters applied during isostatic pressing. In this case, the isostatic pressure can be maintained while the material is cooled below the glass transition temperature of the plasticizer/binder system. This facilitates strong cohesion between contacting particles of neighboring deformed granules. This process, termed "warm isostatic pressing" can form a green body with no indication of the features of the spray dried granules, as shown in FIG. 6D.

In some embodiments, compacting the spray-dried granules can include a series of applied pressures ranging from 50 megapascals (MPa) to 1,000 MPa for a variety of times. For example, compacting may include uniaxially pressing the granules with an applied pressure of approximately 100 MPa followed by an isostatic pressing of approximately 300 MPa. In certain examples, the spherical granules can also be heated before, during, or after pressing so as to assist in removing organic additives from the granules. Heating can include raising to a temperature range of approximately 200° C. to greater than 500° C. (ex., to 600° C., to 700° C., to 800° C., to 900° C., to 1000° C., to 1100° C., to 1200° C., to 1300° C., to 1400° C., to 1500° C.). In some examples, the compact is allowed to cool back to room temperature (approximately 25° C.) prior to releasing of an applied pressure (either uniaxial or isostatic). Thermolysis is one form of heat treatment, which requires very slow heating rates up to dwell temperatures ranging from approximately 300° C. to approximately 1000° C. Sintering is another form of heat treatment, which often benefit from relatively rapid (e.g. 25° C./min) heating rates up to dwell temperatures ranging from approximately 1300° C. to approximately 1900° C. for high-performance oxide ceramics.

In some embodiments, adjusting the parameters of heat-treatment of the specimen may eliminate fissures and porous regions. In particular, adjusting the thermolysis heat ramp and time in combination with the sintering temperature ranges, dwell times, and applied pressure may improve the optical transparency of the transparent ceramic. In the case of thermolysis, there are specific temperature ranges in which a given binder system tends to decompose rapidly. It is key to adjust the temperature schedule so that during those periods, the evolution of gas does not disturb the positioning of the ceramic particles. Rate-controlled thermogravimetry (FIG. 7), which maintains a constant rate of weight loss, is a very useful tool in devising these thermal schedules. In the case of sintering, a temperature schedule that does not favor sintering within the deformed granule, causing the granules to shrink away from each other, coarsening the fissures between them, is key to ultimately eliminating porosity.

Figure 5B:
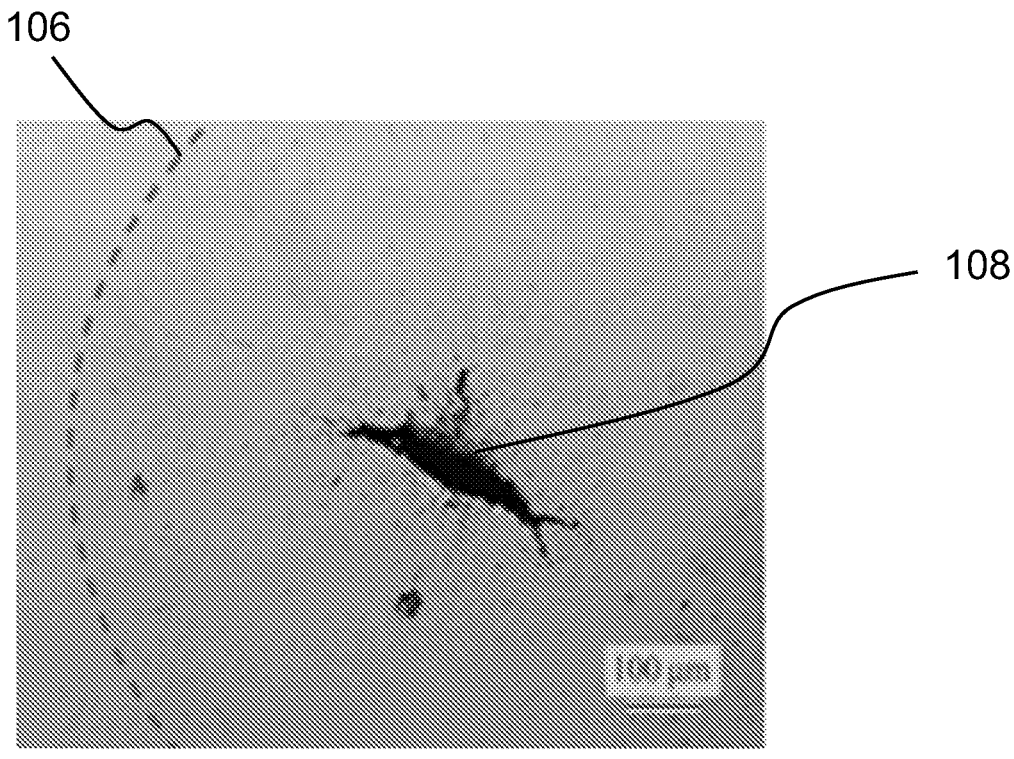

FIG. 5A shows a photograph of a polished specimen sintered by heating at 25° C./min to 1600° C., immediately cooled to 1400° C. with a 4 h dwell, then post-HIPed at 1400° C. and 207 MPa, with a 4 h dwell. The specimen shows general transparency with spherical regions of grey opacity due to pores 106. FIG. 5B provides an SEM image of a polished specimen in the region of one of the grey opaque spheres. The sample was sintered by heating at 25° C./min to 1600° C., immediately cooled to 1500° C., with a dwell of 6 h, then post-HIPed at 1400° C. and 207 MPa, with a 4 h dwell. The specimen shows a ~200 mm fissure 108 with a circular region of porosity surrounding it (see dotted line), in accordance with an exemplary embodiment of the present invention.

Figure 6A:
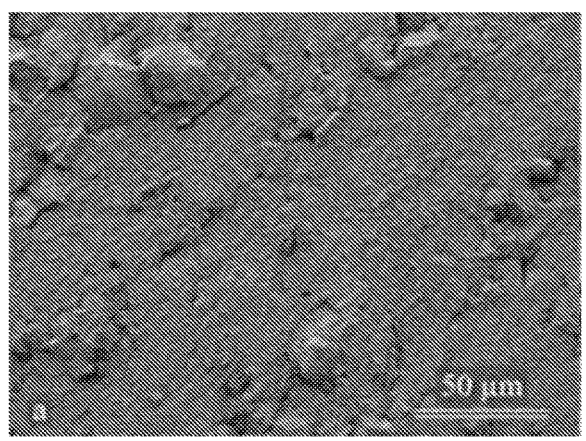
FIGS. 6A through 6D provide images of example fracture surfaces of compacts of spray-dried granules, in accordance with an exemplary embodiment of the present invention.
Figure 6B:
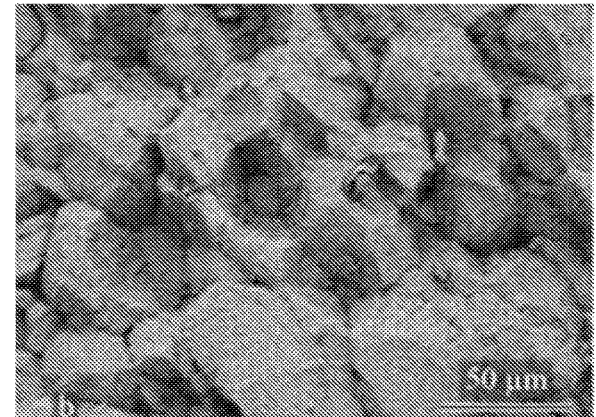
Figure 6C:
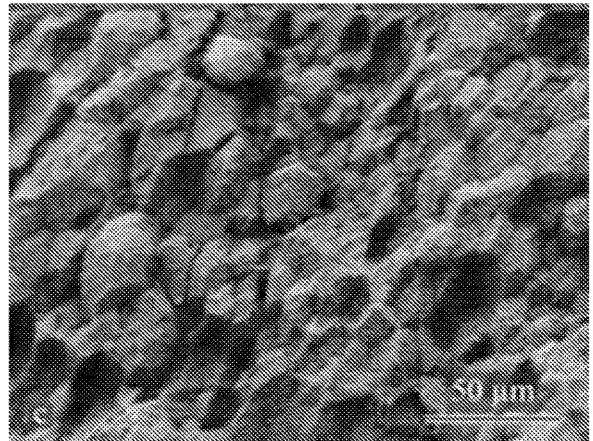
Figure 6D:
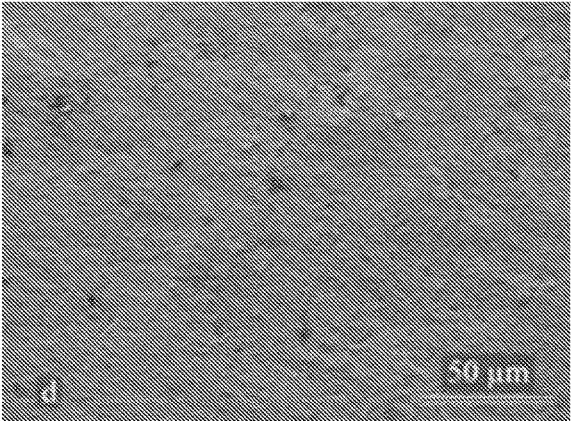

FIGS. 6A through 6D provide images of powder compacts of spray dried granules. In particular, micrographs in FIGS. 6A-6C were granules which were uniaxially and then cold isostatically pressed. Micrograph in FIG. 6A is of granules containing PMMA binder with DBT plasticizer. Micrographs in FIGS. 6B and 6C are of granules containing isobutyl/n-butyl methacrylate binder and n-butyl methacrylate plasticizer. The plasticizer/binder weight ratio was 0.17 for micrograph in FIG. 6B, while it was a higher value of 0.33 for micrograph in FIG. 6C. Micrograph in FIG. 6D is of granules warm isostatically pressed at 158° C. and 550 MPa, with pressure maintained until specimens were cooled back to room temperature.

Figure 7:
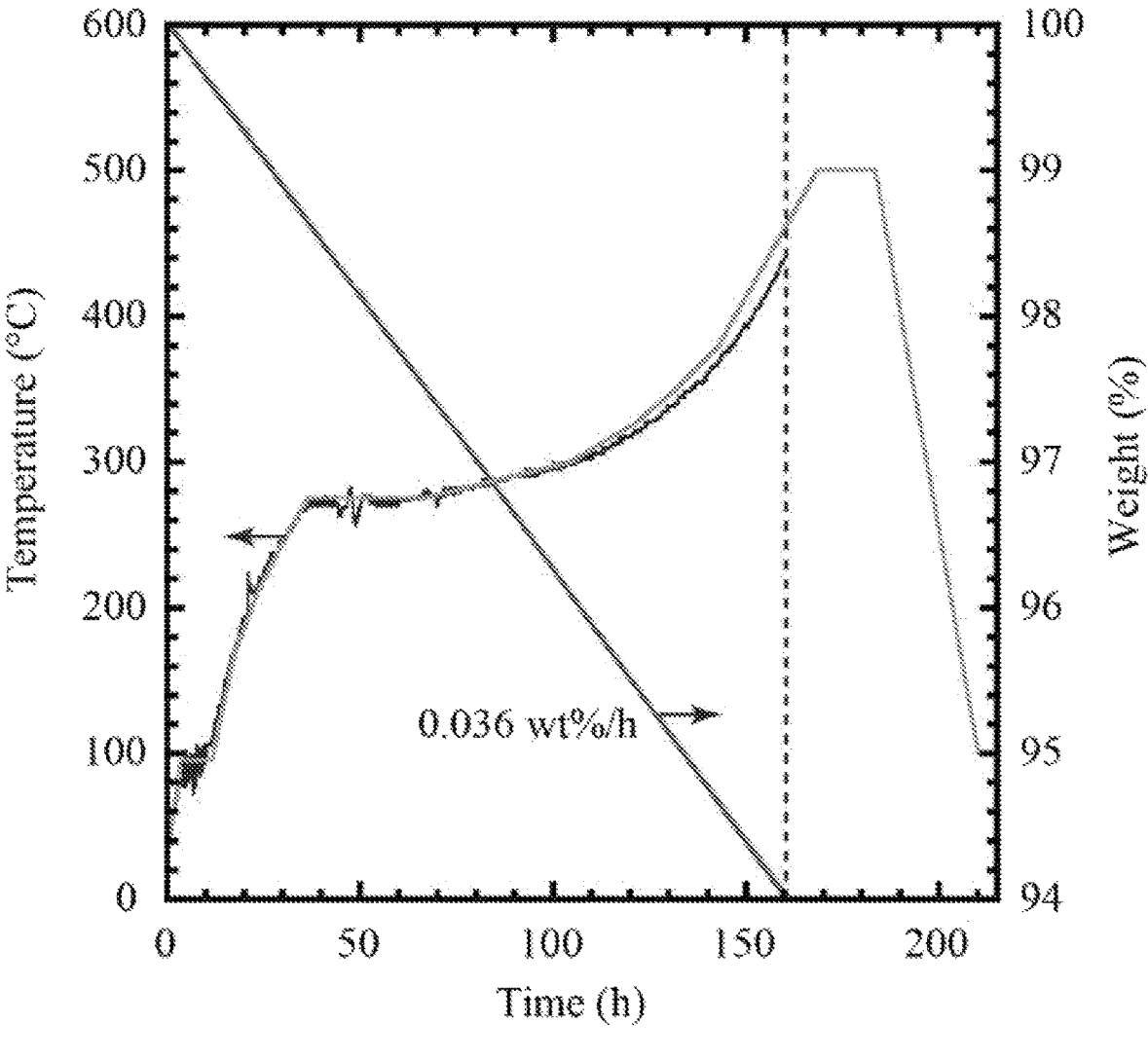
FIG. 7 provides a plot of temperature versus time (left axis) and weight versus time (right axis) of an example method of making transparent ceramics using rate-controlled thermogravimetry, in accordance with an exemplary embodiment of the present invention.

FIG. 7 illustrates weight loss and temperature profile of rate-controlled weight loss thermogravimetry in static air of a 600 mg specimen (with PMMA-DBT binder/plasticizer) programmed to lose weight at a uniform rate over a period of approximately 1 week. The temperature profile generated was transferred to a closely-matching heating schedule in a thermolysis furnace. The light grey trace shows that schedule, with additional heating to 500° C., a dwell period of 15 h, followed by cooling at 0.25° C./min, in accordance with an exemplary embodiment of the present invention.

Figures 8A, 8B, 8C, 8D, 8E, 8F, 8G:
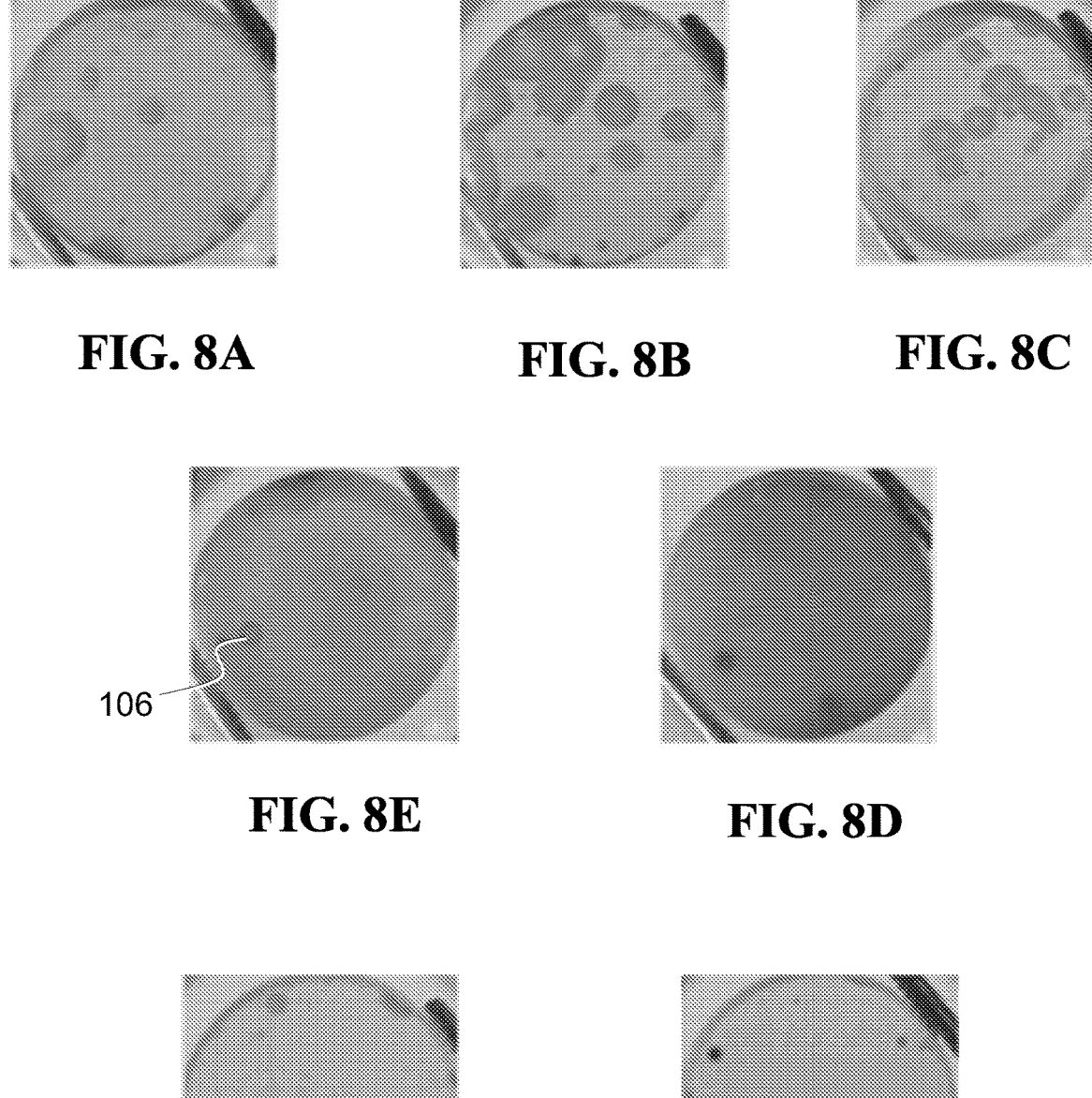
FIGS. 8A-8G provide back-lit images of example transparent ceramics made by varying parameters, with surfaces polished, in accordance with an exemplary embodiment of the present invention.

FIGS. 8A-8G provides back-lit images of polished specimens sintered by heating at 25° C./min to the indicated dwell temperatures and times. The specimens were then post-HIPed at 1400° C. and 207 MPa for 4 h. In FIGS. 8A-8C, the specimen had a dwell time of 5 min. FIGS. 8E-8G 60 min dwell. In FIGS. 8A and 8D, the specimens had a dwell temperature of 1700° C. In FIGS. 8B and 8E, the specimens had a dwell temperature of 1650° C. In FIGS. 8C and 8F, the specimens had a dwell temperature of 1600° C. In FIG. 8G, the specimen had a dwell temperature of 1550° C.

FIGS. 9A-9J provide back-lit images of specimens sintered at various temperatures and times. All specimens were post-HIPed at 1500° C. and 207 MPa, with a dwell of 4 h. After heating at 25° C./min, sintering temperatures and dwell periods were FIG. 9A: 1550° C., 2 h.; FIG. 9B: 1550° C., 3 h.; FIG. 9C: 1500° C., 2 h.; FIG. 9D: 1500° C., 2.75 h.; FIG. 9E: 1500° C., 3.5 h.; FIG. 9F: 1500° C., 4.25 h.; FIG. 9G: 1500° C., 5 h.; FIG. 9H: 1500° C., 6 h.; FIG. 9I: 1500° C., 7 h.; FIG. 9J: 1500° C., 8 h.

Figure 10A:
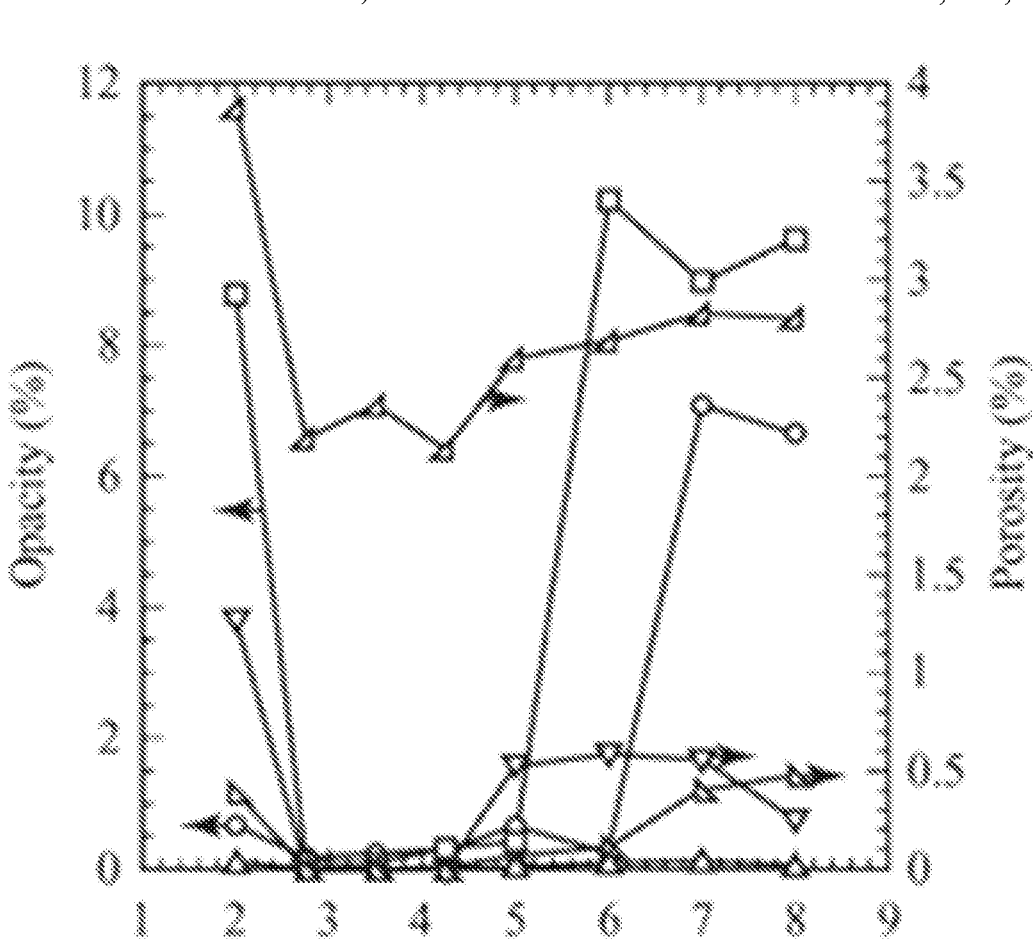
FIG. 10A provides a plot of opacity versus sintering dwell time (left axis) and porosity versus sintering dwell time (right axis) for example transparent ceramics with polished surfaces exposed to varying processing parameters, in accordance with an exemplary embodiment of the present invention.
Figure 10B:
FIG. 10B provides an image of an example transparent ceramic of FIG. 10A, in accordance with an exemplary embodiment of the present invention.

FIG. 10A shows porosity and opacity of $Lu_2O_3$ compacts sintered at 1500° C. for various dwell times, and post-HIPed at 1500° C. for 4 h. ○=Opacity, 50% diameter. □=Opacity, 75% diameter. ⊿=Sintered closed porosity. ◣=Sintered open porosity. ▽=Post-HIPed closed porosity. △=Post-HIPed open porosity. FIG. 10B provides an image of a specimen sintered at 1550° C. for 2 h, and the post-HIPed at 1500° C. for 4 h under 207 MPa of argon pressure.

Figure 11A:
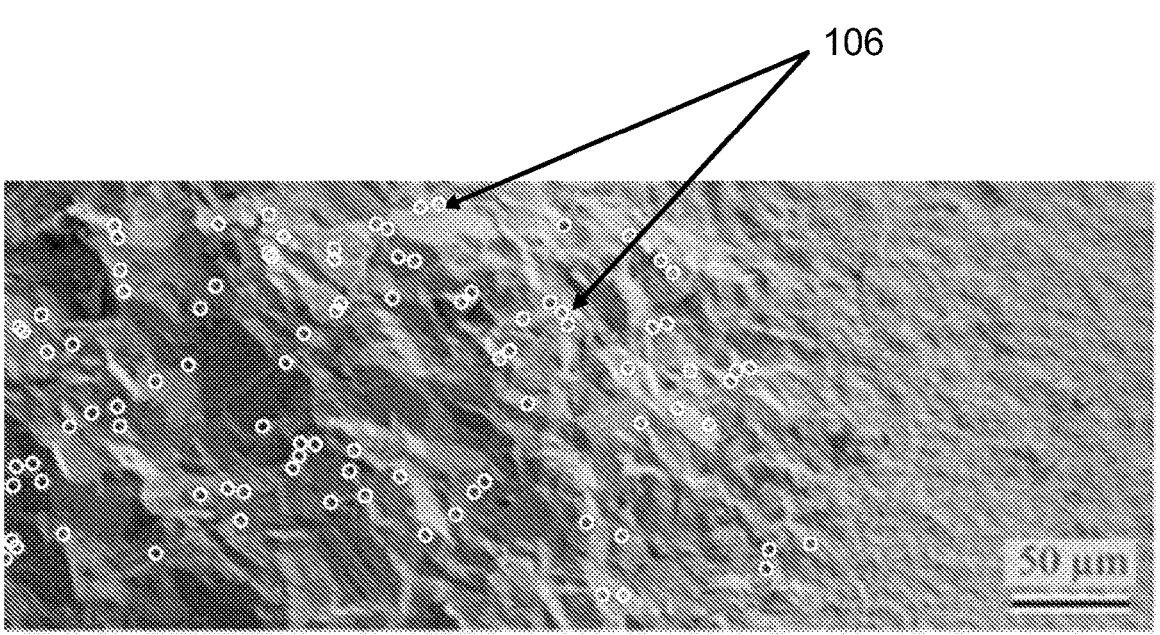
FIGS. 11A and 11B provide SEM images illustrating coarse-grained regions and/or porosity of example transparent ceramics, in accordance with an exemplary embodiment of the present invention.
Figure 11B:
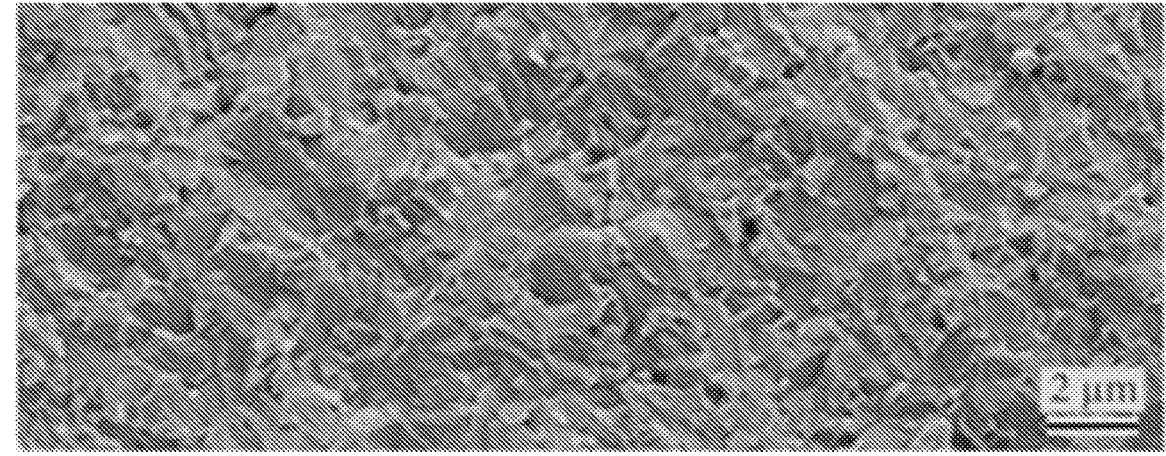

FIGS. 11A and 11B provide SEM images of a fracture surface of a specimen sintered at 1550° C. for 4 h, and post-HIPed at 1500° C. 4 h 207 MPa. Coarse-grained regions on the left side correspond to opaque near-edge regions in FIGS. 9A-9J. Circles mark porosity within grains 106. Fine-grained regions on the right correspond to transparent regions closer to the center of the specimen. FIG. 11B provides an SEM image of a fracture surface of a specimen sintered at 1500° C. for 2.75 h, and post-HIPed at 1500° C. for 4 h, showing a pore-free microstructure with a ~1 mm grain size.

Figure 12:
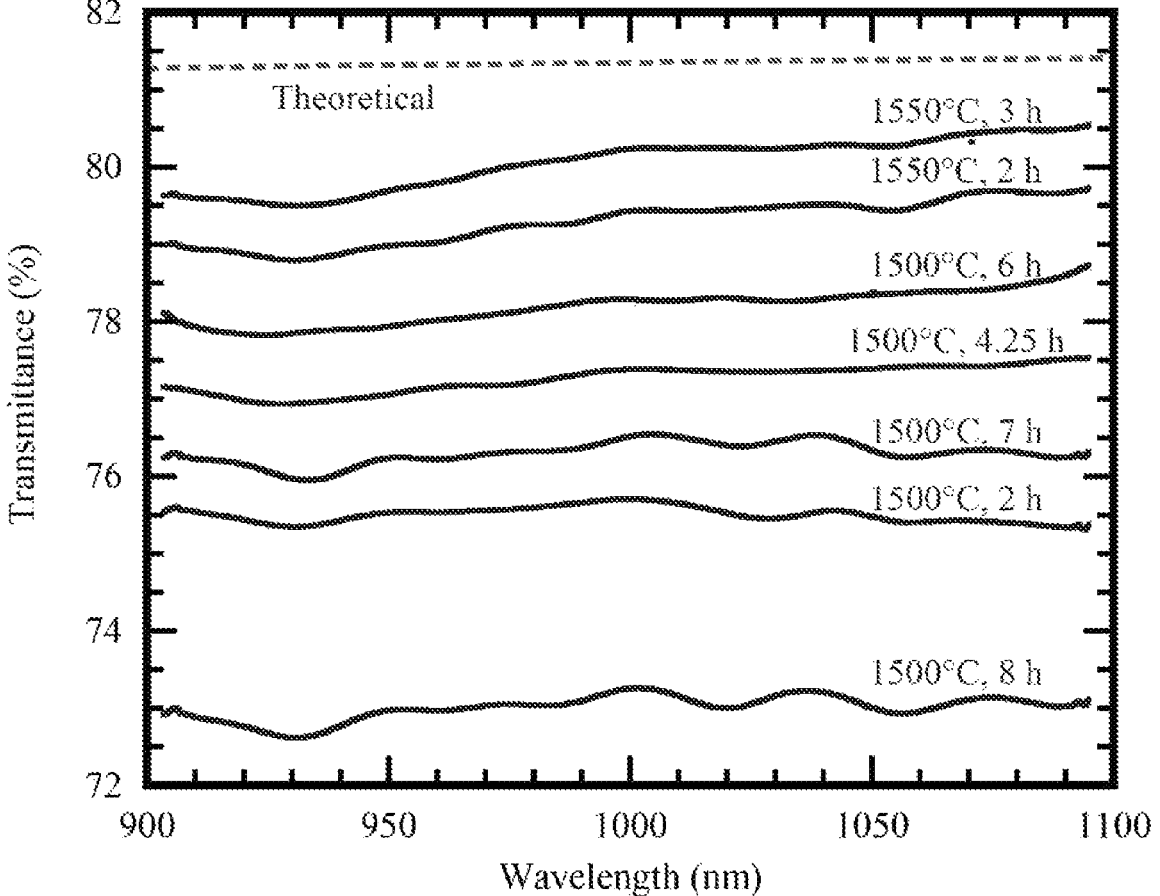
FIG. 12 provides a plot of transmittance versus wavelength of example transparent ceramics, in accordance with an exemplary embodiment of the present invention.

FIG. 12 provides transmittance of sintered and post-HIPed $Lu_2O_3$ powder compacts. All specimens were post-HIPed at 1500° C. and 207 MPa, with a dwell of 4 h. Sintering dwell temperatures and times are indicated for each trace. Specimen thicknesses varied from 2.10 to 2.18 mm. All transmittances were normalized to an average thickness of 2.137 mm using Beer's law.

In some embodiments, the compact may also be doped with one or more rare earth elements. For instance, the metal oxide particles 110 may be mixed with one or more of lanthanum, cerium, praseodymium, neodymium, promethium, samarium, europium, gadolinium, terbium, dysprosium, holmium, erbium, thulium, ytterbium, lutetium, and any oxide of each. Dopant concentration can include at least 0.1 mol %. Doping may result in greater mechanical properties (e.g., harder ceramics, increased fracture strength), enhanced electronic properties (e.g., facilitate semiconducting behavior), and improved optical properties (e.g., being a lasing dopant, or enhance propensity for transparency within 99% theoretical transparency).

Figure 13A:
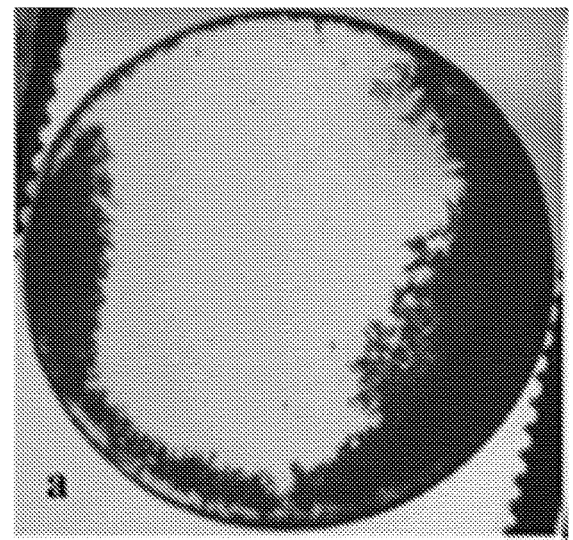
FIGS. 13A through 13C provide back-lit images of example transparent doped ceramics formed by varying sintering parameters, in accordance with an exemplary embodiment of the present invention.
Figure 13B:
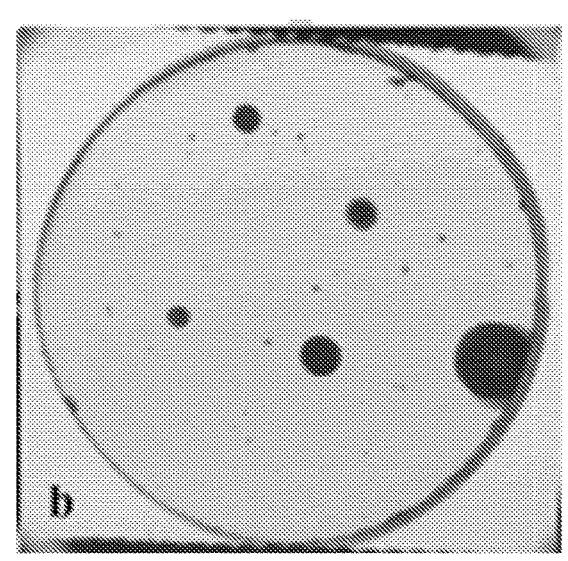
Figure 13C:
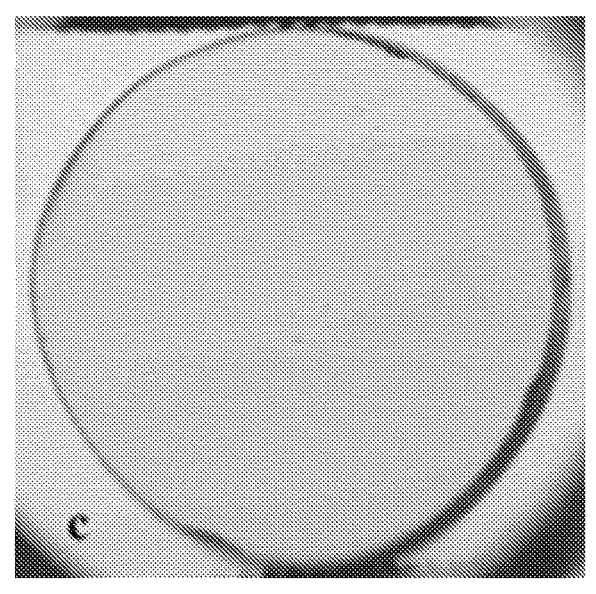

FIGS. 13A through 13C provide back-lit images of sintered, post-HIPed $Yb^{3+}:Lu_2O_3$ and polished specimens, which were typically ~10 mm in diameter, ~2.15 mm thick $Yb^{3+}:Lu_2O_3$. FIG. 13A is 4 mol % $Yb_2O_3$ sintered at 1500° C., 4 h dwell. FIG. 13B is 12 mol % $Yb_2O_3$, sintered at 1500° C., 5 h dwell. FIG. 13C is 16 mol % $Yb_2O_3$, sintered at 1500° C., 8 h dwell.

Figure 14:
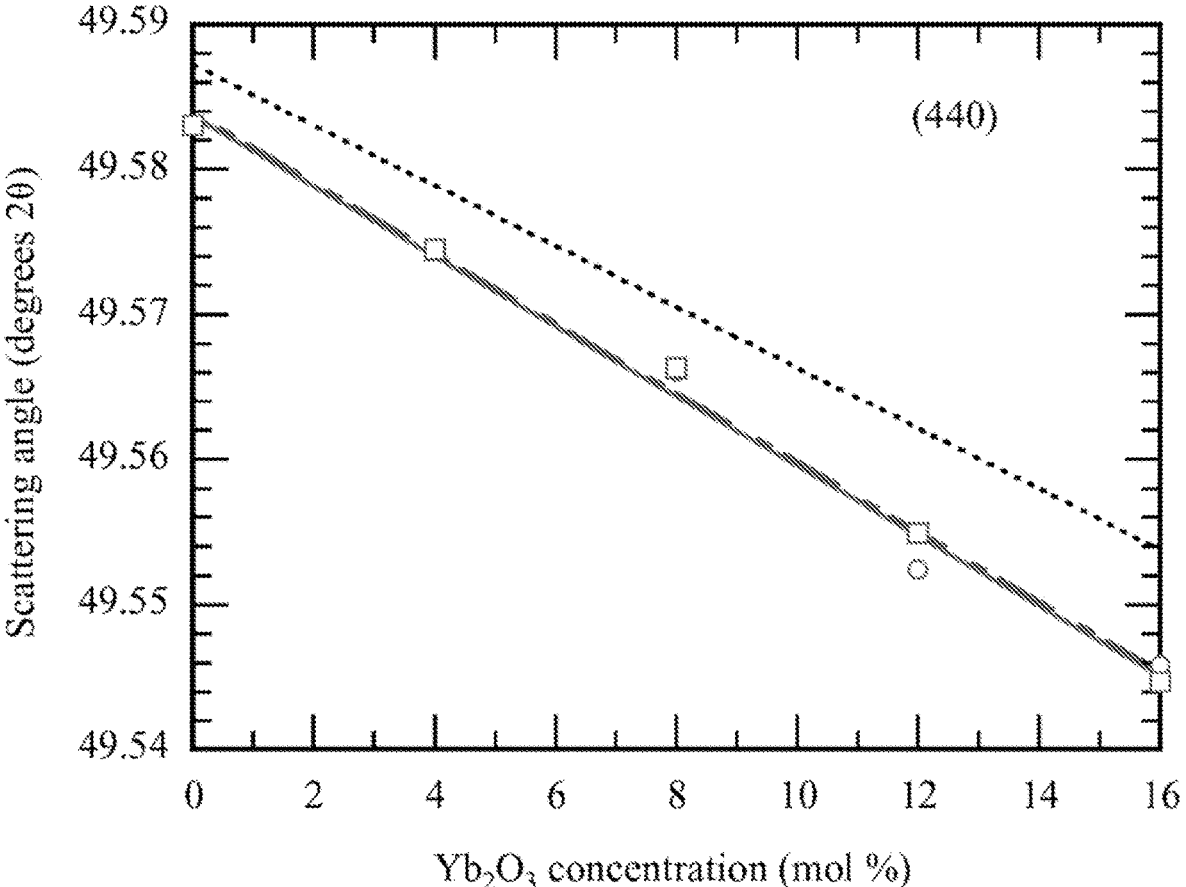
FIG. 14 provides a plot of scattering angle versus dopant concentration of example transparent ceramics, in accordance with an exemplary embodiment of the present invention.
Figure 15:
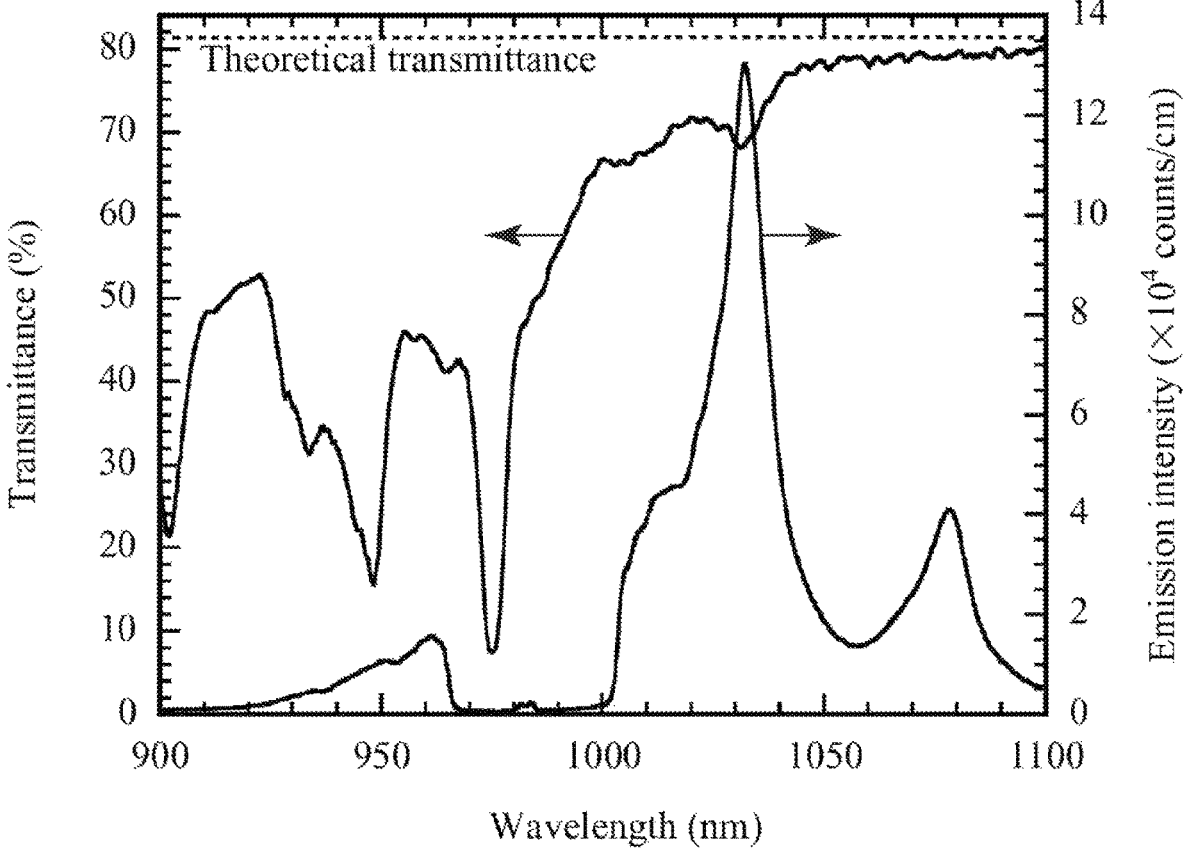
FIG. 15 provides a plot of transmittance versus wavelength (left axis) and emission intensity versus wavelength (right axis) of example transparent ceramics, in accordance with an exemplary embodiment of the present invention.

FIG. 14 provides Lutetia peak location as a function of dopant concentration for the (440) plane based on one (○) and two (□) prominent gold diffraction peaks. The dotted line denotes the theoretical peak locations based on Vegard's law FIG. 15 provides transmittance and photoluminescence of a polished 2.16 mm thick 4 mol % $Yb_2O_3$-doped $Lu_2O_3$ specimen sintered at 1550° C. for 180 min, and then post-HIPed at 1500° C. for 240 min. Pumping power for spectral emission measurements was 100 mW.

Figures 16A, 16B:
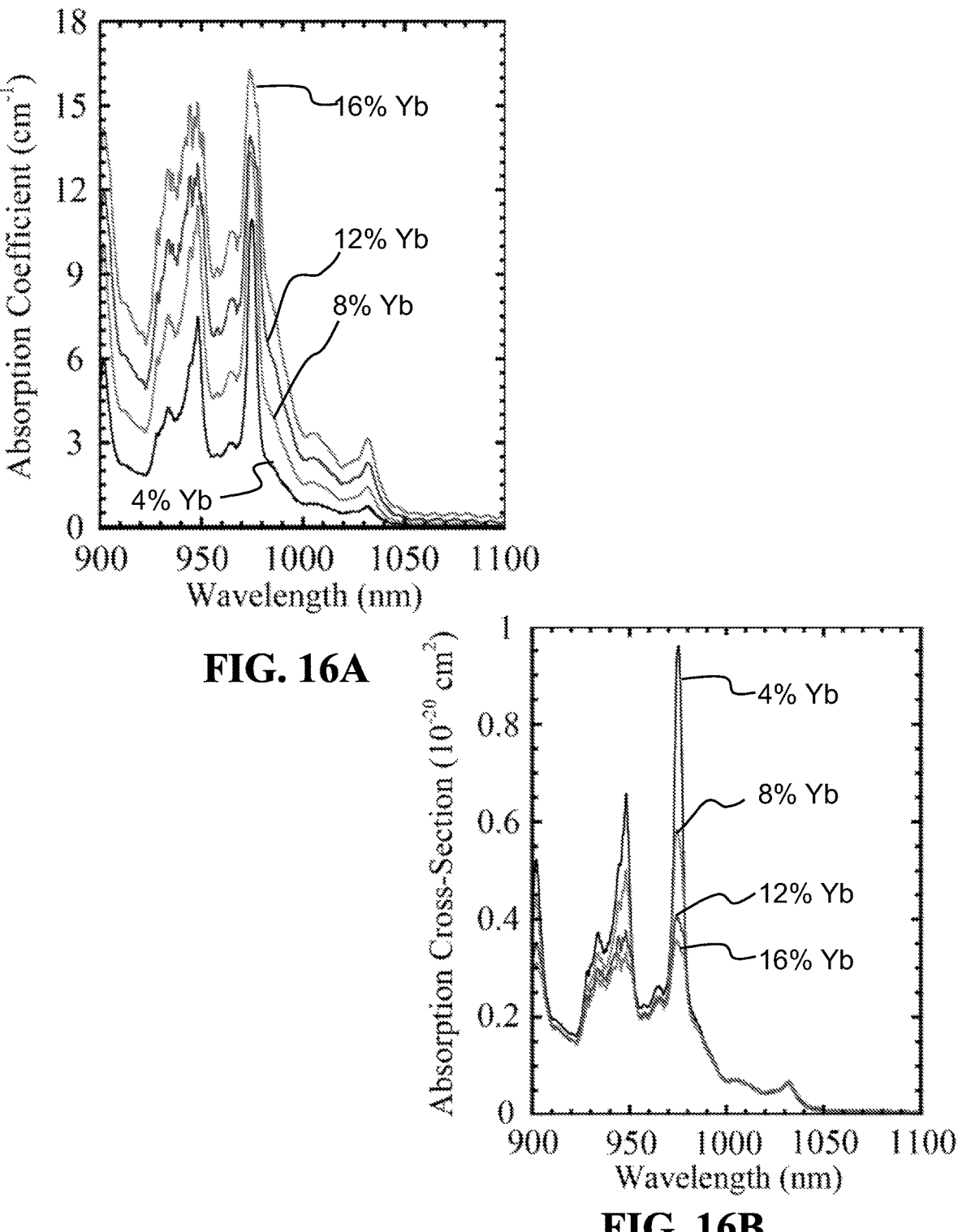
FIGS. 16A through 16C provides plots of absorption versus wavelength comparing emission intensity of example transparent ceramics with varying dopant concentration, in accordance with an exemplary embodiment of the present invention.
Figure 16C:
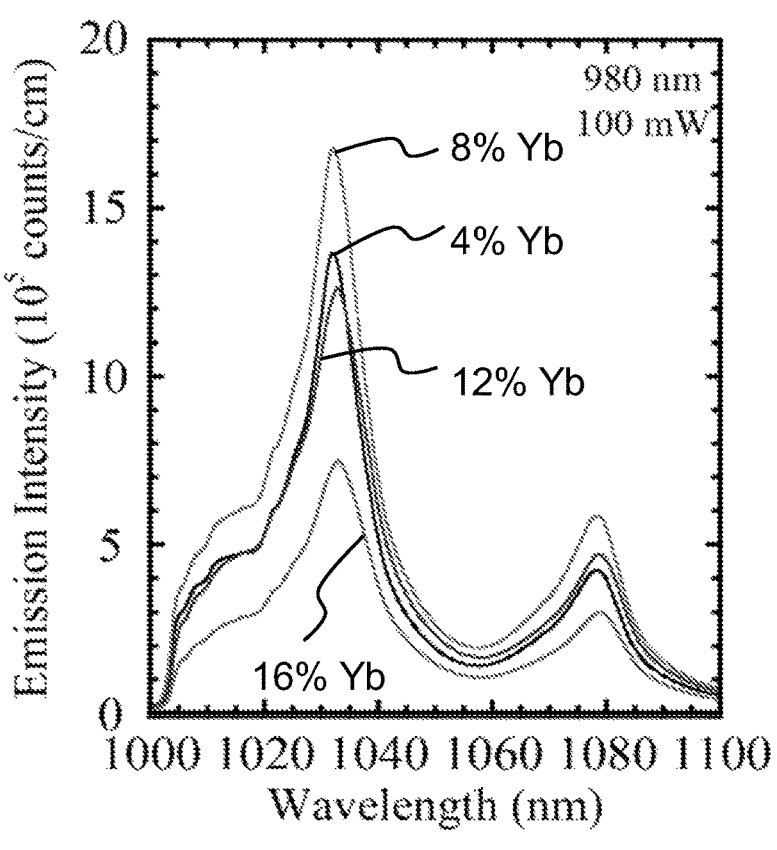
Figure 17:
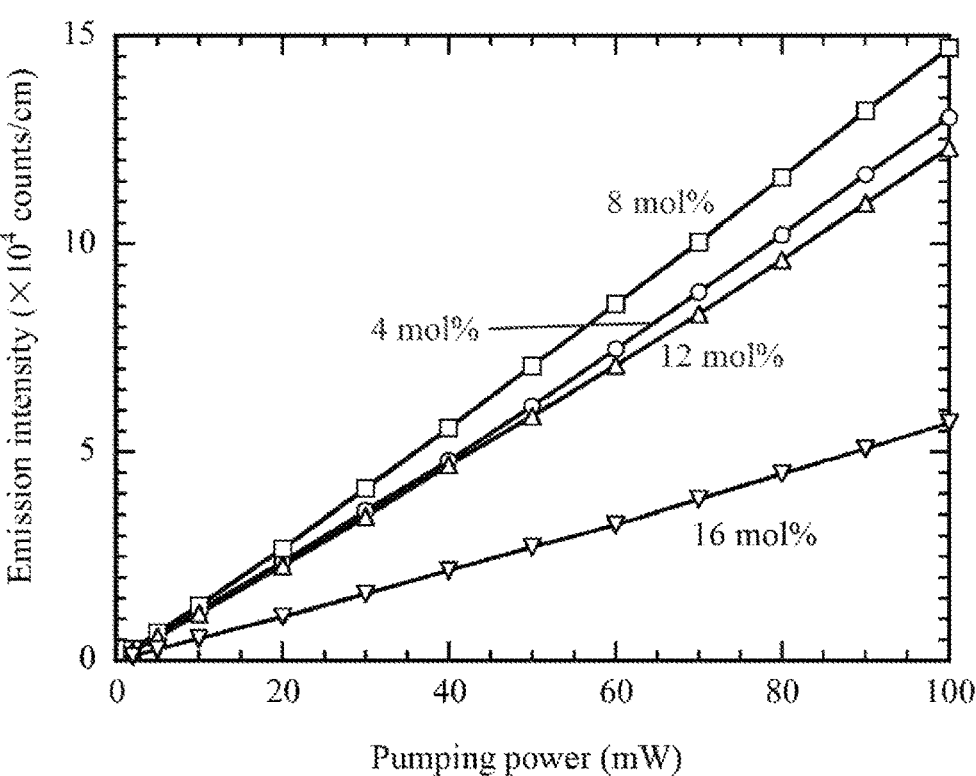
FIG. 17 provides a plot of emission intensity versus pumping power for example transparent ceramics with varying dopant concentration, in accordance with an exemplary embodiment of the present invention.
Figure 18:
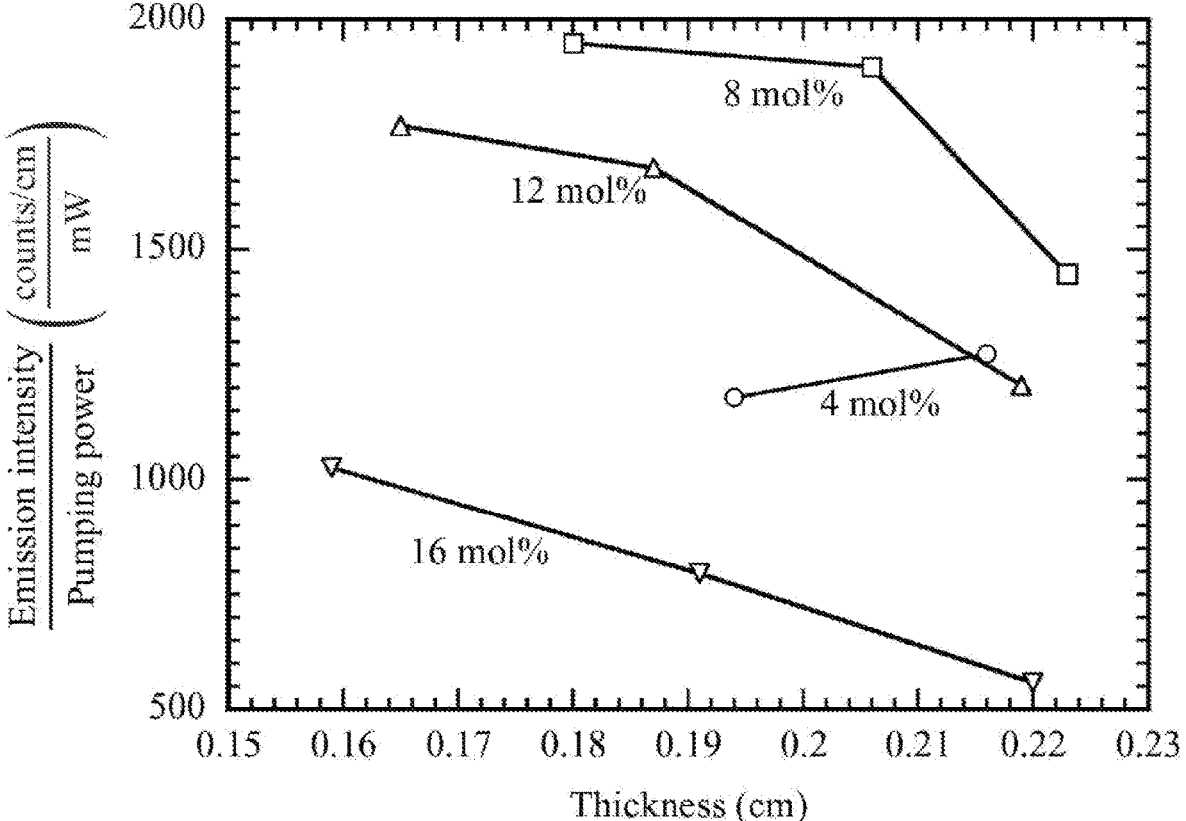
FIG. 18 provides a plot of emission intensity per pumping power versus thickness of example transparent ceramics with varying dopant concentration, in accordance with an exemplary embodiment of the present invention.

FIGS. 16-17 provide emission intensity as a function pumping power for $Lu_2O_3$ specimens with the varying $Yb_2O_3$ doping levels listed in Table 1 (below). FIG. 18 provides a plot of emission intensity per pumping power slopes versus thickness of example transparent ceramics with varying dopant concentration.

FIG. 19 provides a flowchart of method 1900 for manufacturing transparent ceramics. Method 1900 can include providing a compact comprising a metal oxide in step 1902. Method 1900 can further include exposing the compact to a vapor during sintering at step 1904. The vapor can be a sintering aid and can include one of or both fluorine ions and lithium ions. Method 1900 can be used to form a transparent ceramic material comprising at least 90% of a theoretical transparency. Method 1900 can stop after step 1904, or can optionally continue to hot isostatic pressing the compact at a temperature of at least 1400° C. for a time period ranging from about 2 hours to about 8 hours at step 1906. Hot isostatic pressing may be done after sintering.

FIG. 20 provides a flowchart of method 2000 for manufacturing transparent ceramics. Method 2000 can include forming a slurry at step 2002. The slurry can include metal oxide particles, a binder, and a plasticizer. Method 2000 can further include spray-drying the slurry to form spherical granules at step 2004. After spray-drying, method 2000 can include compacting the spherical granules into a green body at step 2006. Method 2000 can then include sintering the green body in a vacuum chamber at step 2008. The vacuum chamber can include a vapor sintering aid configured to inhibit grain growth. Method 2000 can finally produce a transparent ceramic material comprising at least 90% of a theoretical transparency at step 2010. Method 2000 may optionally include polishing the surface. Method 2000 may also optionally include hot isostatic pressing the green body at a temperature of at least 1400° C. for a time period ranging from about 2 hours to about 8 hours.

The following examples further illustrate aspects of the present disclosure. However, they are in no way a limitation of the teachings or disclosure of the present disclosure as set forth herein.

EXAMPLES

Conventional methods of green-body formation of powder compacts, along with temperature/pressure processing methods, were optimized to sinter and post-HIP $Lu_2O_3$ compacts to optical transparency (99.1% of theoretical transparency at 1100 nm). Fissures between remnants of spray-dried granules, yielding opaque spheroids around them, were eliminated by lower temperature heat treatment schedules which minimized fissure coarsening via preferential intragranular densification. A key development was the use of LiF vapor produced adjacent to the compact in the furnace environment, which physisorbed onto particle surfaces of the pre-sintered compact. This acted as a grain growth inhibitor and hence sintering aid.

Example 1: Introduction

Sesquioxide ceramics such as $Y_2O_3$, $Sc_2O_3$, and $Lu_2O_3$, are of interest for the development of high output power and ultra-short pulse lasers. Undoped $Lu_2O_3$, $Y_2O_3$, and $Sc_2O_3$ possess higher thermal conductivities and lower CTE's than the well-established yttria-alumina garnet (YAG) laser hosts. This is critical for thermal management as laser powers are increased, dissipating more heat and showing more dimensional stability during operation. However, solid solution phonon scattering imbued by $Yb^{3+}$-doping, for example, reduces the thermal conductivity of $Sc_2O_3$ and $Y_2O_3$ down to the level of $Yb^{3+}$-doped YAG. By contrast, $Lu_2O_3$ suffers only a minor decrease in thermal conductivity with $Yb_2O_3$ doping, since ytterbium and lutetium ions have very similar masses and bonding forces. Thus, $Yb^{3+}:Lu_2O_3$ is an attractive candidate for high power laser applications because of its inherent heat dissipation capability.

A consensus of published work has found that direct use of commercially-available powders of $Lu_2O_3$ and oxides of the various dopants did not yield acceptable purity, nor facilitate sintering of powder mixture compacts to the needed transparency. Rather, processing typically involved dissolving commercial powder into hot aqueous nitric acid, filtering to remove insoluble impurities, precipitating the precursor of the desired oxides using bases such as ammonium hydroxide, and then washing the precipitate to remove soluble impurities. The desired oxides were then obtained by calcination of the precursor (600-1200° C.), followed by ball milling to obtain sinter-grade powder.

These powders were typically uniaxially pressed, generally followed by a cold isostatic pressing (CIP) step, to form cylindrical disks in the range of 1-2 mm in thickness. In cases in which organic pressing agents were used, a thermolysis step followed. Some investigators formed disk-shaped green bodies via slip casting (gypsum molds) from aqueous suspensions. Generally, sintering aids were avoided for fear of formation of second phases, though in some cases TEOS and LiF were used.

Green compacts have been sintered through a variety of methods: spark plasma sintering, vacuum sintering, without and with post hot isostatic pressing (HIPing), sintering in flowing hydrogen, hot pressing, and two-step pressureless sintering. Until recently, spark plasma sintering was the only one of the listed methods to yield transparent samples while maintaining grain sizes in the sub-micrometer range. Vacuum sintering without subsequent HIPing generally did not produce transparent samples. Prior works have sintered 5 mol % Eu-doped $Lu_2O_3$ powder (formed via flame spray pyrolysis) compacts pressed from spray dried granules. These were vacuum sintered in a tungsten element vacuum furnace over a sintering soak temperature range of 1575-1850° C. for 2 h, followed by post-HIPing at 1850° C. for 4 h in a tungsten element HIP. Prior works found that the minimum sintering soak temperature that yielded closed porosity resulted in the highest HIPed relative density and transmittance. Other works have produced sub-micron grained 0.5 and 3.3% $Yb:Lu_2O_3$ ceramics by vacuum sintering and post-HIPing compacts with co-precipitated nanopowders. These works can sometimes achieve samples with high transmittances while post-HIPing at 1480° C. for 4 h. Still other works have sintered powder compacts in flowing hydrogen at 1850° C. Finally, other work in this area have hot pressed at 1500-1700° C., followed by hot isostatic pressing at 1600-1800° C.; LiF was used as an additive, which was volatilized away during heat-treatment (further described in Example 4 below). Prior works have found that jet milling the synthesized powder improved transparency. Prior work has also attempted to create transparent ceramics by heating specimens to 1600° C., and then immediately cooled to 1500° C. and held for 20 h under vacuum, followed by post-HIPing at 1700° C. at 206 MPa for 8 h.

The emphasis of present disclosure is to develop a processing path to form highly transparent pure $Lu_2O_3$ that requires a minimum of special powder and thermal processing. The methodology developed involves using commercial powders to form compacts directly with no additional chemical processing, sintering and post-HIPing. These optimized processing methods were successfully applied to form highly transparent $Yb^{3+}$-doped $Lu_2O_3$ ceramics, as described in more detail below.

Example 2: Material and Methods

Two kilograms of 3 mm diameter spherical $Y_2O_3$-stabilized $ZrO_2$ milling media (Inframat Advanced Materials, Manchester, CT) were placed in 1000 mL HDPE bottles (VWR, Radnor, PA), taking up about 50% of the container volume. $Lu_2O_3$ powder (160 g, 99.99% pure, HEFA Rare Earth, Richmond BC, Canada) was weighed, suspended in 200 mL of acetone (or ethanol), along with a soluble binder and plasticizer of choice. One of two acetone-soluble binder systems was used throughout this work: (1) polymethyl methacrylate (PMMA) binder (Elvacite 2008, Lucite International, $T_g$=111° C.) with dibutyl phthalate (DBT) plasticizer (liquid at room temperature), and (2) isobutyl/n-butyl methacrylate binder (Elvacite 2046, Lucite International, $T_g$=35° C.) with n-butyl methacrylate plasticizer (Elvacite 2044, Lucite International, $T_g$=20° C.). These suspensions were ball milled for 72 h.

Each suspension was spray-dried (Glatt Air Technologies, Ramsey, NJ) into ~40 μm granules, in an electrically-heated chamber with a flowing nitrogen atmosphere. The slurry was atomized through a 48 kHz ultrasonic nozzle (Sono-Tek, Milton, NY). X-ray diffraction studies showed no evidence of zirconia impurity (from milling media) in the spray-dried powder.

Cylindrical compacts were uniaxially pressed using 2 g of granulated powder poured into a 12.7 mm diameter die (MTI Corporation, Richmond, CA), and pressed at 70 or 150 MPa. The compacts were then sealed in evacuated latex bags (Trexler Rubber Company, Ravenna, OH) and cold-isostatically pressed (CIPed) at 345 MPa (Autoclave Engineers, Erie, PA).

These compacts were exposed to either a thermolysis heat-treatment of 1° C./min to 400° C., 2 h dwell, or 1° C./min to 550° C., 2 h dwell. Both were under conditions of flowing pure oxygen. Subsequent weight and dimensional density measurements showed green relative densities of 57-59%.

For sintering heat-treatment, a graphite heating element vacuum tube furnace (Model M10, Centorr Vacuum Industries, Nashua, NH) was used. The chamber was maintained under vacuum using a continuously-pumping turbomolecular pump (pressure $<10^{-4}$ mbar). A mass spectrometer (Inficon MPS Residual Gas Analyzer, Bad Ragaz, Switzerland) was attached to the furnace to analyze for gases present during heat treatment. A 25 mm ID graphite tube extended through the interior of the cylindrical graphite heating element. Lutetia platforms were pressed and sintered from coarse un-milled powder. These platforms, on which the lutetia compacts were placed, were used to isolate the compacts from direct contact with the inner graphite tube. Temperature was monitored by a tungsten-rhenium thermocouple inserted to be in close proximity to the compacts. Because of poor feedback control in a vacuum environment at low temperatures, furnace power was initially fixed at 33% which caused the furnace temperature to settle at ~450° C. PID control with a heating rate of 25° C./min was then used to a specific sintering dwell temperature. In early work, heat-treatments involved heating to 1600° C., and then immediately cooling to various lower dwell temperatures. In later work, specimens were simply heated to specified dwell temperatures.

Sintered specimens were exposed to an annealing heat-treatment in flowing oxygen, heating at 5° C./min to 1100° C., with a 2 h dwell. These were then buried in coarse $Lu_2O_3$ powder inside of a tungsten crucible. They were post-HIPed, similarly buried in coarse $Lu_2O_3$ powder inside of a tungsten crucible, at either 1400° C. or 1500° C., under 207 MPa of argon gas pressure, with a 4 h dwell.

Specimen relative densities were characterized using Archimedes method after sintering and again after post-HIPing and polishing of radial surfaces, using sequentially finer diamond media, down to 0.05 μm. Microstructures of fracture surfaces were analyzed using scanning electron microscopy (LEO 1530 SEM, Carl Zeiss AG, Oberkochen Germany) and associated energy dispersive spectroscopy (Ultra 60 SEM, Carl Zeiss AG, Oberkochen Germany, with an Oxford Instruments X-max 50 EDS detector, Abington, UK). Transparency was evaluated via back-lit specimens, either using direct photography through a magnifying glass, or via a low power stereo microscope (SMZ-800, Nikon Instruments Inc., Melville, NY). Images were digitally analyzed via a program written in Matlab to count pixels above and below a threshold greyscale value, inside centered perimeter rings drawn either of 50% or 75% of specimen diameters (10-11 mm).

Optical transmittance was measured (PyLoN-IR, Teledyne Princeton Instruments, Trenton, NJ) over a wavelength range of 900-1100 nm using a constant-current light source (BPS120, B&W Tek, Plainsboro NJ). The device was calibrated using a 50% neutral density filter (Edmund Optics, Barrington, NJ), utilizing the filter manufacturer's provided in-line transmittance data (0° angle of incidence) of that filter. Multiplicative calibration factors were determined, mapping the experimentally-obtained transmittance of the filter to the manufacturer provided values. These calibration factors were then applied to all lutetia specimen transmittances. The theoretical transmittance of lutetia was calculated based on the Fresnel equation for perpendicular reflectance from a dielectric surface: $R=(n_1-n_2)^2/(n_1+n_2)^2$; where $n_1$ is the wavelength-dependent index of refraction of lutetia, and $n_2$ is the index of refraction of air. Theoretical transmittance was based on factoring in reflectance from top and bottom surfaces (incident radiation on the bottom surface was assumed diminished by previous reflection from the top), and assuming no absorption within the specimen.

Powder compacts were sintered with LiF (Alfa Aesar, Haverhill, MA) either within the powder compact (LiF and $Lu_2O_3$ milled and spray dried together), or with LiF powder in a graphite crucible adjacent to the compact in the hot zone of the furnace. Between furnace runs, an empty-furnace heated to 1850° C. with a dwell of 2 h, under constant pumping, was used for the purpose of removing condensed LiF from (relatively) cold refractory surfaces in the furnace. This much higher temperature heat-treatment was intended to ensure that any LiF which may have condensed outside of the hot-zone, would not re-volatilize, forming an unintended vapor during subsequent sintering heat-treatments.

For powder compacts sintered with adjacent LiF, presence of lithium and/or fluorine in the sintered microstructure was characterized using time-of-flight secondary ion mass spectrometry (TOF SIMS, IONTOF, Münster, Germany). With this characterization technique, specimen surfaces are milled away with a cesium ion beam, and at selected depths, specimens are exposed to a bismuth ion beam which liberates ions which are then accelerated, and then identified based on their time of flight to a detector (which in turn is based on ion mass). Characterized specimens were ground, removing ~¼ mm of material from the surface, and then polished to a 1 μm diamond media finish.

Example 3: Results

Initial work on sintering of as-received $Lu_2O_3$ powder involved uniaxial pressing and CIPing of as-received powder, followed by vacuum sintering at 1650-1700° C. for 4 h, annealing in static air at 1100° C. for 2 h, followed by post-HIPing at 1700° C. for 4 h. Post-HIPed relative densities were greater than 99%, and text could be read behind polished disk specimens. The average grain size was ~50

μm, and transmittance at 1100 nm (the lasing wavelength for $Yb^{3+}:Lu_2O_3$) was, at maximum, 83.4% (for no $Yb_2O_3$ additive) of its theoretical limit.

For any further improvement in transparency, additional powder processing steps were required. Ball milling of as-received powder brought the particle size down to a relatively uniform ~100 nm. An initial binder system of PMMA (no plasticizer) was used in the spray-drying suspension. This binder system resulted in inadequate consolidation of spray-dried granules in the compact, as depicted in FIG. 2. Microstructural evolution during the path of sintering heat-treatment (FIGS. 3A-3F) reveals that densification initiated among the particles within granules after heating to 1200° C. Above that temperature, abnormal grain growth accelerated concurrent with sintering. Gaps between spray-dried granules coarsened as neighboring granules contracted toward their centers during sintering. Sintering temperatures of ~1700° C., were necessary to facilitate sintering across these gaps. Addition of dibutyl phthalate ($C_{16}H_{22}O_4$) as a plasticizer to PMMA improved convergence of spray dried granules after uniaxial pressing and CIPing (a plasticizer/binder ratio of 0.17 was found to be optimum), but did not fully eliminate residual inter-granular gaps in the sintered microstructure.

A significant advancement with regard to impeding grain growth was achieved, somewhat by accident, in an experiment in which two compacts were placed on lutetia stages inside the hot zone of the sintering furnace, side-by-side. One specimen had lithium fluoride powder (1 wt. %) mixed in the compact, while the other did not. The specimen with the LiF suffered a degraded sintered relative density (67.1%), while the specimen without the additive showed improved relative density (95.0%) over the expected result for such a sample under the given sintering schedule (typically ~93%). Two follow-on experiments were then run: (1) sintering of a $Lu_2O_3$ compact buried in a mixture of LiF and coarse $Lu_2O_3$ powder and (2) sintering of a $Lu_2O_3$ compact next to a graphite crucible containing 1-5 wt. % LiF powder (relative to 2 g samples). Sintering of the buried specimen yielded a similar degraded sintered relative density (68.9%). Sintering with a graphite boat containing varying amounts of LiF powder adjacent to the specimen yielded similar improved results in relative density (94.8-97.3%). Depicted in FIGS. 4A and 4B are the microstructures for sintered specimens with and without LiF used in this manner, each based on optimized heat-treatment schedules. The presence of LiF resulted in higher relative densities with lower sintering temperatures, and with significantly smaller grain and pore sizes. This method of incorporating LiF into the furnace hot zone was used for all results which follow.

Remaining as defects in post-HIPed polished specimens were capriciously-located grey spherical opaque zones in an otherwise visually transparent matrix (FIG. 5A). At the center of these regions were curved fissures interpreted to be coarsened residual boundaries between spray-dried granules. In attempt to enhance the cohesion of spray dried granules after uniaxial and isostatic pressing, a binder system of isobutyl/n-butyl methacrylate copolymer (which has a higher polymeric chain length, and yet a lower $T_g$, than PMMA) using plasticizer n-butyl methacrylate was evaluated. Compared to using the PMMA-based binder system (FIG. 6A), the resulting green microstructure fracture surface showed much more intergranular fracture (FIGS. 6B and 6C), implying relatively poor cohesion between particles on the surfaces of adjacent spray-dried granules. The plasticizer to binder ratio in this binder system was increased from 0.17 to 0.33. This change yielded smaller granules, but the intergranular fracture was equally extensive (FIG. 6C).

In a different attempt to improve particle cohesion across the boundaries between granules, uniaxially-pressed compacts, vacuum-sealed in mylar bags, were loaded into a warm isostatic press (heated oil being the pressure-transmitting fluid). The compacts were heated to 158° C. with pressure increasing to 550 MPa. That substantial pressure was maintained while the parts were cooled to room temperature, and only then was the pressure slowly released. There was no evidence of granule boundaries in SEM microstructures of fracture surfaces of specimens processed in this way (FIG. 6D).

Using the standard (uniaxial pressing and CIPing) compact formation method, post-thermolysis dimensional relative densities were 57-59%, whereas by this WIP method, post-thermolysis dimensional relative densities were 61-64%. Unfortunately, the standard thermolysis schedule applied to these parts resulted in substantial cracking and fracturing of the compact, owing to the inability of organics combustion products during thermolysis to escape the part interior without pressurizing and rupturing the green body into many pieces.

To correct for this, software was written for a thermogravimetric analyzer to feedback-control furnace power based on a specimen weight loss when heating under static (open) air. A programmed weight loss rate of 0.036 wt. %/h yielded a temperature profile which ensured a steady and slow evolution of combustion products (combustion of binder/plasticizer with oxygen in air). As shown in FIG. 7, this temperature profile was then programmed into the thermolysis furnace, yielding post-thermolysis compacts without cracking. Subsequent sintering and post-HIPing yielded inconsistently darkened specimens, interpreted to be remnant graphite via constricted gas diffusion.

Returning to the conventional method of green processing, the sintering temperature/time study depicted in FIGS. 8A-8G show that the tendency for opaque spheres to form, along with a tendency toward general opacity, decreased with lower sintering temperatures and longer dwell times. Informed by these results, FIGS. 9A-9J show the appearance of polished specimens from a sintering temperature/time study, using relatively lower sintering temperatures of 1550 or 1500° C. Measured open and closed porosity after sintering at 1500° C., and again after post-HIPing are shown in FIG. 10A. Optimum transparency was obtained over the dwell period range of 2.75 to 4.25 h. This is visually apparent in FIG. 10B. For shorter or longer dwell periods, a zone of opacity is seen in the outer radial periphery of the specimens. The area percentage of the optical paths through specimens blocked by opaque regions are also plotted in FIG. 10A; these results are consistent with visual appearance in FIGS. 9A-9J and porosity data plotted in FIG. 10A. An SEM micrograph of the region of interface between transparent and opaque regions is shown in FIG. 11A, in which opaque regions showed a significantly coarsened grain size, with pores trapped within those grains. The microstructure shown in FIG. 11B of a fracture surface of a highly transparent post-HIPed specimen exposed to a 2.75 h dwell period appears pore-free with a grain size of ~1 μm.

It was anticipated that residual gas analysis of gases drawn to the turbomolecular pump from the furnace hot zone might give an indication as to whether lithium cations or fluorine anions were preferentially adsorbed onto particle surfaces of the lutetia compact during sintering heat treatment. There was, unfortunately, no indication of either species, or LiF itself. This was the case even when the mass spectrometer intake port was moved as close as feasible to the hot zone of the furnace.

SEM/EDS analysis of fracture surfaces of specimens sintered in the presence of vapors of LiF was undertaken to look for fluorine in the microstructure. Lithium is of too small atomic mass to be detectable by the available SEM EDS system. In a minority of a large number of scans of volumes which included grain boundaries, peaks at 0.677 eV corresponding to fluorine could scarcely be detected relative to background noise. Scans of volumes associated with grain centers showed no evidence of fluorine.

Two specimens were analyzed by TOF SIMS; one sintered (1600° C., no dwell, cooled at 25° C./min to 1400° C., 12 h dwell) with an adjacent crucible of LiF powder, and one post-thermolysis compact, which was not yet exposed to sintering heat-treatment. Reporting results of the ratio of $Li+/Lu+$ normalizes for different scan times and areas. Results showed a $Li^+/Lu^+$ ratio of $7.373 \times 10^{-3}$ for the un-fired compact, and $1.084 \times 10^{-2}$ for the compact sintered in the presence of LiF. Separate evaluation for fluorine, detected as $Cs_2F^+$, showed a $Lu^+/Cs_2F^+$ ratio of $6.927 \times 10^{-4}$ for the un-fired compact and $1.675 \times 10^{-2}$ for the compact sintered in the presence of LiF.

FIG. 12 shows the transmittance of various samples over the spectral range of 900-1100 nm. The specimen sintered at 1550° C. for 3 h showed the highest transmittance. At 1100 nm, this specimen had a transmittance of 99.1% of the theoretical limit.

Example 4: Discussion

The intent of evaluating the binder system in FIGS. 6B and 6C (isobutyl/n-butyl methacrylate binder and n-butyl methacrylate plasticizer) was the belief that the original binder (PMMA with DBT plasticizer) system was not adequately plastic for the granules to deform into complete mutual accommodation under the action of uniaxial and cold isostatic compression. Interpretation of these microstructures shows that binder strength was more important that binder plasticity. The significant increase in definition of intergranular fracture indicates poor cohesion between particles of neighboring granules. The increased plasticizer/binder ratio (FIG. 6C) likely decreased the viscosity of the suspension, resulting in finer spray dried granules. However, in both cases, inter-granular cohesion was especially poor.

The intent of warm isostatic pressing, using the original binder system (PMMA/DBT), was to further consolidate the compact at a temperature at which the binder system was highly plastic. By maintaining pressure while cooling below the glass transformation temperature of the binder/plasticizer ($T_g=38.88°$ C., as measured by differential scanning calorimetry), contacting particles on the periphery of neighboring granules were maintained in close contact, and when the pressure was released, the stiff binder facilitated strong intergranular amalgamation. This yielded remarkably improved intergranular cohesion as compared to the standard uniaxial/isostatic cold pressing method, as made clear in FIG. 6D. This method, requiring very long thermolysis times, was abandoned for the present work, but shows promise with future parameter adjustment.

LiF has primarily been used as a sintering aid in pressure-assisted sintering (hot pressing and spark plasma sintering) of transparent $Lu_2O_3$ and $MgAl_2O_4$ ceramics, in which the additive was directly mixed with the ceramic powders. It was argued that lithium fluoride reacts with the graphite dies, as well as with impurities within the green body to form volatile species. These impurities along with residual LiF, were interpreted to have volatilized away, consistent with their presence not being detected in the densified ceramics. In these cases, the externally-applied pressure compensates for any bloating tendency via volatilization of LiF. There do not appear to be any literature citations of regarding the use of LiF additions to $Lu_2O_3$-based compacts for pressureless sintering.

Lithium fluoride melts at 848.2° C., and reaches a vapor pressure of 1 bar at −2000° C. During sintering heat-treatments in this work under constant evacuation via a turbomolecular pump, the vacuum gauge typically registered a surge in pressure at −1050° C. This represents the temperature at which vaporization of LiF from its graphite crucible was rapid. It is interpreted that this vapor permeated the $Lu_2O_3$ compacts and was physisorbed onto particle surfaces at temperatures below those of extensive densification. The results shown in FIGS. 4A and 4B imply that physisorbed LiF, later confined to grain boundaries as grain boundaries replace solid-vapor interfaces, functions as a grain growth inhibitor. It is interpreted that these lithium and fluorine ions present at grain boundaries and having different size and valence than the host cations and anions, enhanced bonding across grain boundaries and thus lowered the grain boundary energy and the driving force for grain growth. This in turn kept porosity from coarsening (consolidating as a consequence of grain growth), and maintained a high concentration of grain boundaries per unit volume to facilitate mass diffusion into these smaller pores, ultimately increasing the sintered relative density that could be achieved. This also circumvented pores being swept into grain interiors via rapid grain growth; this type of porosity generally cannot be removed by post-HIPing. Use of LiF applied using the present method is aptly coined "vapor-phase assisted sintering."

Mass spectroscopy was unsuccessful at detecting lithium fluoride, or its fragments. This shows its propensity to condense on cold surfaces before it could be possibly captured by the mass spectrometer. SEM EDS provided some, but not definitive evidence, of fluorine located at the grain boundaries. The detection limit of the EDS system (according to the manufacturer) is −0.2 wt. %. TOF SIMS is purported to have a sensitivity limit in the parts-per-million to parts-per-billion range. This characterization method showed no significant presence of $Li^+$ in the microstructure, but some indication of fluorine. However, inconsistencies/scatter in results obtained by this characterization technique has fostered skepticism regarding drawing any conclusions based on it. When LiF was mixed directly into the powder compact, rapid volatilization bloated the specimen, lowering the sintered relative density. When LiF was mixed with coarse $_{Lu2O3}$ powder (that the samples were in turn buried in), once molten, it was possibly drawn to coat the coarse particles by capillary action, and was largely tied up with these particles, attenuating the vapor available to interact with particles in the specimen compact.

The grey opaque regions in FIG. 5A are interpreted to be from the inability of post-HIPing to remove porosity in a spherical zone around relatively large intergranular fissures. Under isostatic pressurization, these open fissures underwent elastic compressive deformation, locally relieving the compressive stress that would have otherwise removed remnant porosity. This left a roughly spherical zone around the fissures with remnant porosity (FIG. 5B) after post-HIPing.

A lower concentration of grey spherical regions was found with lower sintering dwell temperatures and longer dwell periods. This is interpreted to be a result of an increased propensity for sintering to occur across the deformed granule boundaries when initial intra-granular sintering rates were prohibited from being too rapid. More elevated sintering dwell temperatures encouraged preferential sintering within the granules, opening up the gaps between the granules.

Opaque rings were found in the radial periphery of some cylindrical specimens (FIGS. 8A-8G). For short (e.g., 2 h) dwell periods, inadequate time was permitted for sintering to a fully closed porosity state (total porosity was the highest for this sample). Closed porosity was only achieved inside a certain penetration depth into the sample, with this radial opaque region outside of it. Only within those interior boundaries was post-HIPing effective. For dwell periods exceeding 4.25 h, it is interpreted that the extended time under high vacuum permitted extraction of grain boundary-soluble LiF. As shown in FIGS. 11A and 11B, this in turn resulted in abnormal grain growth, and the sweeping of pores into the grain interiors where they could not be removed by post-HIPing, yielding opacity. TOF SIMS evaluation of these two regions yielded inconclusive results regarding relative concentrations of $Li+$ and P.

Example 5: Conclusion—Transparency Achievement in $Lu_2O_3$ Disks

Using standard ceramic processing methods of spray drying powders with acetone-soluble binder/plasticizer, uniaxial pressing, CIPing, thermolysis, sintering, and post-HIPing; process optimization resulted in pure $Lu_2O_3$ disks of near-perfect (99.1% of theoretical transmittance at 1100 nm) transparency. This was facilitated via physisorption of LiF vapors produced adjacent to the sintering compact. These ions remained as these surfaces converted to grain boundaries, and acted as a grain growth inhibitor, keeping pores located at fine-scale grain boundaries which could later be eliminated via post-HIPing. Occasional opaque grey spheres which appeared to varying degrees in polished post-HIPed specimens, were a result of fissures in the sintered microstructure, caused by imperfect cohesion between particles of neighboring granules. Sintering dwell temperatures of 1500° C. and 1550° C. were low enough to prohibit rapid densification within granules, otherwise resulting in the opening up of fissures between granules during heat-treatment. These intergranular fissures were eliminated by WIPing of uniaxially-pressed compacts, maintaining elevated pressure while cooling below the $T_g$ of the binder/plasticizer system. For these compacts, very slow thermolysis schedules were devised (via rate-controlled thermogravimetry) to eliminate cracking and fracture from hindered gas escape during thermolysis.

Example 6: $Yb^{3+}$:$Lu_2O_3$ Ceramics

As described supra, a means by which LiF, a sintering aid mixed with the powder compact for pressure-assisted sintering methods, could be used to great benefit for pressureless sintering was developed. LiF powder, placed in a crucible in close proximity to the $Lu_2O_3$ compact in the vacuum furnace created a vapor, some of which was physisorbed onto $Lu_2O_3$ particle surfaces. During sintering, this LiF collected at grain boundaries, lowering grain boundary energy, and acted as a powerful grain growth inhibitor and sintering aid. This process was coined "vapor-assisted sintering." It was found that post-HIPing was ineffective at eliminating zones of porosity around occasional and capricious fissures in the microstructure, originating from incompletely consolidated spray-dried granules after uniaxial and isostatic pressing. Adjusting sintering schedules to lower temperatures (1500-1550° C.) and longer times largely eliminated this problem.

Example 7: Materials and Methods for Yb³⁺:Lu₂O₃ Ceramics

Optimized procedures were successfully applied for Lu₂O₃ powders mixed with 99.99% pure Yb₂O₃ powder (HEFA Rare Earth, Richmond BC, Canada). The binder system was polymethyl methacrylate (Elvacite 2008, Lucite International) with a dibutyl phthalate (DBT) plasticizer (system $T_g$=38.88° C.). Quantities of both lutetia and ytterbia powders were adjusted to yield spray-dried powders with 4, 8, 12, and 16 mol % ytterbium. All samples were uniaxially pressed at 150 MPa, cold isostatically pressed (CIPed) at 345 MPa (Autoclave Engineers, Erie, PA), and exposed to a thermolysis heat-treatment of 1° C./min to 550° C., 2 h dwell under flowing oxygen.

Specimens were sintered in a graphite heating element vacuum tube furnace (Model M10, Centorr Vacuum Industries, Nashua, NH) between 1450-1600° C. in 50° C. increments, with dwell periods between 2 to 8 h, in 1 h increments. Sintered specimens were annealed in flowing oxygen at 5° C./min to 1100° C., and held for 2 h. They were then buried in coarse Lu₂O₃ powder inside of a tungsten crucible and post-HIPed at 1500° C., under 207 MPa of argon gas pressure, with a 4 h dwell.

Samples were polished with sequentially finer diamond media, down to 0.05 μm. Transparency was visually evaluated with back-lit samples against daylight and with a low power stereo microscope (SMZ-800, Nikon Instruments, Inc., Melville, NY). The percent of the area made opaque due to remnant porosity was digitally measured via pixel analysis with a Matlab program, based on images from the stereo microscope. Regions of interest were set to 50% and 75% of the sample diameter.

Optical transmittance was measured (PyLoN-IR, Teledyne Princeton Instruments, Trenton, NJ) with the same experimental set-up as described in the previous work. The transmittance measurements were used to obtain the absorption coefficient α by:

$$T(\lambda) = \frac{(1-R)^2 \exp(-\alpha(\lambda)t)}{1 - H^2 \exp(-2\alpha(\lambda)t)}$$

where T(λ) is the measured transmittance, R is the theoretical reflectance based on dispersion data of perfectly transparent lutetia, and t is the sample thickness. The absorption cross section $\sigma_{abs}(\lambda)$ is then calculated by:

$$\sigma_{abs}(\lambda) = \frac{\alpha(\lambda)}{N_{Yb:Lu_2O_3}}$$

where $N_{Yb:Lu2O3}$ is the number density of ytterbia ions for the various dopant concentrations, approximated by the number of lutetium positions the ytterbium ions can theoretically replace, according to the chemical formula for lutetia.

Photoluminescence measurements were taken using the same linear set-up used for transmittance measurements, with a 980 (450 mW) continuous wave (CW) fiber-coupled laser at room temperature used for pumping. A notch filter (NF980-41, ThorLabs, Newton, NJ) was used to protect the detector and a camera (for focusing) from the pumping radiation. The specimens were pumped at 2, 5, and 10-100 mW (in 10 mW increments) radiation, adjusted with a polarizer. The light passed through another polarizer and half-wave plate to ensure the incident light was of the same polarization for all pumping levels. There was no indication of polarization dependence with a 0° angle of incidence as measured from the surface normal. The photoluminescence measurements were normalized for sample thicknesses by dividing the emission intensities by the specimen thickness. After optical properties were measured, specimens were further thinned down and re-polished, and optical property measurements were repeated.

To ensure that complete solid solution was achieved at all doping levels, specimens at the varying doping levels were sintered at 1500° C. for 7 h and subsequently annealed at 5° C./min to 1100° C. for 2 h under flowing O₂. The samples were polished to a 1 μm finish and sputter coated with 1 μm of gold and subsequently annealed at 2° C./min to 400° C. for 2 h in static air to remove any lattice strain-induced broadening of gold diffraction peaks from the sputter-coating process. The 1 μm coating of gold on polished surfaces served as an internal standard for slight differences in specimen heights when loaded in into the x-ray diffractometer. Without the gold, the peak shifts due to varying dopant concentrations could not be reliably characterized.

Extended-time x-ray diffraction scans were performed with a 0.013° 2θ step size and 1853.59 seconds per step (Empyrean, Malvern PaNalytical, Almela, Netherlands). Peak positions were determined by curve-fitting the diffraction peaks with HighScore Plus (Malvern, PaNalytical, Almela, Netherlands) software, utilizing the pseudo-Voigt profile function with multiple passes for accurate determination of peak locations. For profile fitting, a larger peak base width (cut-off where peak intensities are calculated) was used to better capture peak edges. Peak asymmetry (more prevalent at low 2θ) was also assumed utilizing a double-split mode where deconvolution was based on peak widths and shapes for the left and right side of the diffraction peaks. Peak shifts based on one and two prominent gold diffraction peaks were determined for the (440) and (622) planes. The shifts were applied linearly. For the one peak case: the difference between the ICDD peak and the scan peak was calculated then applied to the lutetia peak locations. For the two peak case: the differences between the ICDD and scan peaks were calculated and a linear interpolation was taken and applied to the lutetia peak locations.

Example 8: Results for Yb³⁺:Lu₂O₃ Ceramics

With a dwell temperature of 1450° C., specimens for all evaluated dwell periods (2-5 h) achieved sintered relative densities below 97%, and since they did not achieve a closed porosity state, did not post-HIP to transparency. At a dwell temperature of 1500° C., specimens of varying dwell periods largely achieved closed porosity; however, the development of an opaque peripheral region was observed under two conditions: (1) at short dwell times, closed porosity was not achieved at interior regions close to the periphery, resulting in those regions failing to achieve transparency after post-HIPing, and (2) at extended dwell times, it is interpreted that physisorbed lithium, fluorine, and/or LiF (from vapors of LiF produced during sintering heat-treatment) escaped over time from the peripheral regions of the compact allowing abnormal grain growth to proceed. This was seen in the prior study on sintering of undoped $Lu_2O_3$ powder compacts. An example of such an opaque peripheral region is shown in FIG. 13A.

Using a dwell temperature of 1550° C., the slightly elevated temperature facilitated close-porosity conditions in advance of volatilization of physisorbed grain boundary second phases. This dwell temperature yielded good transparences for all dwell times studied (2-5 h). At a dwell temperature of 1600° C., transparency was achieved for short dwells, but specimens became translucent to opaque with extended dwell periods. Electron microscopy of microstructures showed that this was associated with abnormal grain growth which had swept porosity to grain interiors, where it could not be removed via post-HIPing. This temperature was abandoned for the 12 and 16 mol % $Yb_2O_3$ series.

Sintering results at 1500° C. from the 8-mol % series elucidated the need for extended dwell times with increased doping levels—the higher concentrations required more time for mass diffusion to achieve complete solid solution. In some embodiments, the higher concentrations allowed for improvement in the binding strength (lower escaping tendency) of the physisorbed grain boundary impurity phase due to a lower propensity for porous outer regions.

Specimens with 16-mol % ytterbia were sintered for 5 h or longer at the same dwell temperatures utilized with the 12-mol % series. Samples with exceptional transparency were achieved for both temperatures for dwell times of 5 h or more. An example is shown in FIG. 13C. All samples achieved post-HIPed relative densities ≥99.5% of the doped theoretical densities calculated with the rule of mixtures; samples sintered at 1550° C. achieved 99.9-100% relative densities. For both dwell temperatures, the same trend of decreasing opacity was observed with increased dwell times.

TABLE 1

| $Yb_2O_3$ Concentration (mol %) | Sintering Schedule | Sintered Relative Density (%) | Post-HIPed Relative Density (%) | Relative Transmittance at 1100 nm (%) |
| --- | --- | --- | --- | --- |
| 4 | 1550° C., 3 h | 98.06 | 99.56 | 97.91 |
| 8 | 1550° C., 4 h | 98.00 | 99.23 | 95.21 |
| 12 | 1550° C., 6 h | 98.78 | 99.59 | 97.41 |
| 16 | 1550° C., 8 h | 98.89 | 100.00 | 96.16 |

For a sintering dwell temperature of 1550° C., Table 1 shows that optimum transmittance (at 1100 nm) required longer dwell times with higher doping concentrations. At higher concentrations, longer dwell times are needed to reach a closed porosity state. The mixed nature of the higher doped lutetia may permit retention of the LiF with the longer dwell times needed for sintering.

The x-ray diffraction peak shifts based on one and two prominent gold diffraction peaks are shown in FIG. 14, which shows good agreement between the shifts in lutetia diffraction peak locations due to the doping concentration levels for the (440) plane. The trend follows Vegard's law, although the line deviates slightly at higher concentrations. As shown in the SEM microstructures, a higher frequency of sub-micron grains occurred with higher doping levels.

The transmittance spectra of a 4 mol % sample sintered at 1550° C. for 3 h is shown in FIG. 15. The expected absorption peaks for the ytterbium ion are apparent. This was true at all doping levels, but deeper absorption peaks were measured with higher dopant concentrations, as would be expected. The appropriate emission wavelengths were observed in the photoluminescence spectra superimposed in FIG. 15 for the same 4 mol % sample. The gap in the emission data centered around 980 nm is due to the notch filter used to protect the detector from the incident radiation.

FIG. 17 shows the normalized emission intensities measured at the various pumping levels for the specimens sintered with the schedules in Table 1. The slopes of emission intensity with pumping power were linear. These slopes increased from 4 to 8 mol % ytterbia but showed a significant decline for 12 and 16 mol % ytterbia. For all photoluminescence spectra, no stimulated emission was observed, as expected, as an appropriate laser cavity was not created for these measurements. FIG. 18 shows the changes in these slopes for the normalized by sample thickness and emission intensities as a result of thinning the specimens. With decreasing specimen thickness, an increase in slope was observed with specimens doped with 8 mol % of ytterbia or higher; the 16 mol % specimen showed a steady increase and the 8 and 12 mol % specimen showed a decaying increase after thinning a second time. The 4-mol % specimen showed a decrease in emission intensities after thinning.

Example 9: Discussion for $Yb^{3+}$:$Lu_2O_3$ Ceramics

Surveys and research into the behaviors of highly-doped Yb:YAG (single crystal) and glass fiber gain media have been performed to elucidate the loss mechanisms observed. Prior measured the surface temperatures of Yb:YAG single crystals doped with 8.8, 12.7, and 15.7-at % ytterbium undergoing photoluminescence. Under non-lasing conditions, surface temperatures were significantly higher with higher concentrations than observed under lasing conditions. Under lasing conditions, gain saturation and roll-over (decrease in gain) were also observed for samples doped at 12.7 and 15.7% with increased pumping power. The losses were attributed to potential energy transfer to impurities or excitation to the charge transfer state. Losses due to excitations into the charge transfer band (changing the valence of ytterbium ions from 3+ to 2+) have been studied for Yb:YAG single crystals due to the presence of oxygen vacancies that occur during single crystal growth, which can be attenuated or eliminated by annealing under oxygen. Prior work also observed decreases in emission intensities and fluorescence lifetimes with ytterbium concentrations exceeding 16.3-at % in the YAG single crystal.

Research with similar reduced emission behaviors with highly doped ytterbium-doped yttria and lutetia (single crystal and ceramic) have also been reported and summarized. Prior reports indicate lasing behavior of a 10-mol % Yb:$Lu_2O_3$ ceramic with an output of 16 W and slope efficiency of 74%; however, at higher pumping levels, rollover was observed. Fluorescence lifetimes remained about constant up to 8-mol % but decreased at 10-mol %. This was attributed to the continued energy transfer to other ions and ultimately to a quenching site—impurities or grain boundary defects—potentially resulting in nonradiative decay and thermal effects. Other reported similar rollover behaviors with 10-mol % Yb:$Lu_2O_3$ thin disk single crystals (but no decrease in fluorescence lifetime), indicate that 10-mol % may be the limit for suitable gain media. While no quenching effects were observed with the single crystals produced by other works, other investigations observed slight or significant decays in fluorescence lifetimes at lower concentrations; these effects were attributed to reabsorption, impurities, and concentration quenching with the clustering of dopant ions (at grain boundaries) at high concentrations.

Prior work by also demonstrated this decrease in fluorescence lifetimes with increased concentrations attributed to energy transfer to either impurity ions that may be present even with high purity (99.999%) powders or oxygen vacancies and the ytterbium ion valence change.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the United States Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way.

What is claimed is:

1. A method comprising:
thermally vaporizing a material comprising lithium and fluorine to produce a vapor; and
pressureless sintering a compact comprising a metal oxide while exposing the compact to the vapor to form a transparent ceramic material having at least 90% of a theoretical transparency;
wherein thermally vaporizing the material is proximate the compact.

2. The method of claim 1, wherein thermally vaporizing the material comprises thermally vaporizing the material at a temperature of at least 800° C.

3. The method of claim 1 further comprising:
forming the compact comprising:
drying a slurry comprising the metal oxide to yield a granulated powder;
pressing the granulated powder; and
heat-treating the granulated powder.

4. The method of claim 1 further comprising:
after pressureless sintering, hot isostatic pressing the compact at a temperature of at least 1400° C.

5. The method of claim 1 further comprising:
after pressureless sintering, hot isostatic pressing the compact for a time period ranging from about 2 hours to about 8 hours.

6. The method of claim 1, wherein the metal oxide comprises a material selected from the group consisting of $B_2O_3$, $Al_2O_3$, AlON, SiAlON, $In_{0.74}Sn_{0.18}O_{0.08}$ (ITO), $Ga_2O_3$, $In_2O_3$, $Sc_2O_3$, $Y_2O_3$, $Lu_2O_3$, $La_2O_3$, $Ac_2O_3$, $TiO_2$, $V_2O_3$, $Nd_2O_3$, $Eu_2O_3$, $Gd_2O_3$, $Tb_2O_3$, $Dy_2O_3$, $H_{02}O_3$, $Tm_2O_3$, $Yb_2O_3$, $LuYO_3$, $Y_3Al_5O_{12}$, $MgAl_2O_4$, and combinations thereof.

7. The method of claim 1 further comprising:
prior to pressureless sintering, doping the compact by a range of approximately 2 mol % to 20 mol % of a dopant.

8. The method of claim 1 further comprising:
forming the compact comprising:
forming a slurry comprising:
metal oxide particles;
a binder; and
a plasticizer;
spray-drying the slurry to form spherical granules; and
compacting the spherical granules into the compact;
wherein:
the compact is a green body;
the vapor is a gaseous sintering aid configured to inhibit grain growth and pore coarsening during sintering; and
the transparent ceramic material comprises at least 99% of a theoretical transparency.

9. The method of claim 8, wherein the transparent ceramic material comprises a relative density of at least 90%.

10. The method of claim 8, wherein forming the slurry comprises ball milling the metal oxide particles to a diameter ranging from about 50 nm to about 500 nm.

11. The method of claim 8, wherein compacting the spherical granules comprises pressing the spherical granules at a first pressure of at least 100 megapascals (MPa); and at a second pressure of at least 300 MPa.

12. The method of claim 8 further comprising:
after pressureless sintering, hot isostatic pressing of the green body at a temperature of at least 1400° C.

13. The method of claim 8 further comprising:
after pressureless sintering, hot isostatic pressing of the green body for a time period ranging from about 2 hours to about 8 hours.

14. The method of claim 8 further comprising:
prior to pressureless sintering, doping the green body by a range of approximately 2 mol % to 20 mol % of a dopant.

15. A method comprising:
vaporizing a material comprising lithium and fluorine to produce a vapor sintering aid; and
pressureless sintering a compact comprising a metal oxide while exposing the compact to the vapor sintering aid to form a transparent ceramic material having at least 90% of a theoretical transparency;
wherein vaporizing the material is proximate the compact.

16. The method of claim 15, wherein vaporizing the material comprises thermally vaporizing the material at a temperature of at least 800° C.

17. The method of claim 15 further comprising:
forming the compact comprising:
forming a slurry comprising:
metal oxide particles;
a binder; and
a plasticizer;
spray-drying the slurry to form spherical granules; and
compacting the spherical granules into the compact.

18. The method of claim 15 further comprising at least one of:
prior to pressureless sintering, doping the compact by a range of approximately 2 mol % to 20 mol % of a dopant; or
after pressureless sintering, hot isostatic pressing the compact at a temperature of at least 1400° C. for a time period ranging from about 2 hours to about 8 hours.

* * * * *